(12) United States Patent
Yamaguchi et al.

(10) Patent No.: US 10,768,636 B2
(45) Date of Patent: Sep. 8, 2020

(54) AUTOMATIC VEHICLE DISPATCHING SYSTEM AND SERVER DEVICE

(71) Applicant: PANASONIC INTELLECTUAL PROPERTY MANAGEMENT CO., LTD., Osaka (JP)

(72) Inventors: Katsuhisa Yamaguchi, Osaka (JP); Takumaru Nagai, Tokyo (JP); Eiji Fukumiya, Osaka (JP); Masahiro Anezaki, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 165 days.

(21) Appl. No.: 16/034,016

(22) Filed: Jul. 12, 2018

(65) Prior Publication Data

US 2018/0329429 A1    Nov. 15, 2018

Related U.S. Application Data

(63) Continuation of application No. PCT/JP2017/006472, filed on Feb. 22, 2017.

(30) Foreign Application Priority Data

Mar. 11, 2016    (JP) ................................. 2016-047714

(51) Int. Cl.
*G08G 1/00* (2006.01)
*G05D 1/02* (2020.01)
(Continued)

(52) U.S. Cl.
CPC ......... *G05D 1/0291* (2013.01); *G05D 1/0285* (2013.01); *G05D 1/0289* (2013.01);
(Continued)

(58) Field of Classification Search
CPC . G05D 1/02; G08G 1/00; B60R 25/30; B62D 6/04
See application file for complete search history.

(56) References Cited

U.S. PATENT DOCUMENTS

| 4,860,209 A | * | 8/1989 | Sugimoto | ............ G05D 1/0255 |
| | | | | 701/25 |
| 5,625,559 A | * | 4/1997 | Egawa | ............ G05B 19/41895 |
| | | | | 701/117 |
| 2017/0008490 A1 | * | 1/2017 | Sako | ...................... B60R 25/25 |

FOREIGN PATENT DOCUMENTS

| JP | 60-204012 | 10/1985 |
| JP | 61-262903 | 11/1986 |

(Continued)

OTHER PUBLICATIONS

U.S. Appl. No. 15/955,755 to Shuhei Matsui et al., which was filed Apr. 18, 2018.

(Continued)

*Primary Examiner* — Yuri Kan
(74) *Attorney, Agent, or Firm* — Greenblum & Bernstein, P.L.C.

(57) ABSTRACT

An automatic vehicle dispatching system includes automatic vehicles, and a server device that performs communication with the automatic vehicles. The server device includes: a storage that stores: area information that includes path points in a predetermined area that indicate a drive route, each of the path points including driving attributes that represent an automatic vehicle movement state on the drive route; and vehicle information indicating a vehicle attribute of each of the automatic vehicles; and a route searcher that generates, for each of the automatic vehicles, first route information that includes path points selected from among the path points of the area information according to the vehicle information that corresponds to the automatic vehicle, the (Continued)

first route information indicating a first drive route for the automatic vehicle. Each of the automatic vehicles is controlled to drive based on the first route information generated.

13 Claims, 32 Drawing Sheets

(51) Int. Cl.
*B60R 25/30* (2013.01)
*B62D 6/04* (2006.01)
*G08G 1/16* (2006.01)

(52) U.S. Cl.
CPC ........... *G05D 1/0297* (2013.01); *G08G 1/202* (2013.01); *G05D 2201/0212* (2013.01); *G08G 1/166* (2013.01)

(56) References Cited

FOREIGN PATENT DOCUMENTS

| | | | | |
|---|---|---|---|---|
| JP | 07-219633 | 8/1995 | | |
| JP | 09-319433 | 12/1997 | | |
| JP | 11-184521 | 7/1999 | | |
| JP | 2006-113687 | 4/2006 | | |
| JP | 2015-225394 | 12/2015 | | |
| JP | 2015225394 A | * 12/2015 | ............... | G05D 1/02 |
| WO | 2015/151862 | 10/2015 | | |

OTHER PUBLICATIONS

U.S. Appl. No. 15/928,659 to Kazuya Furukawa, which was filed Mar. 22, 2018.

International Search Report (ISR) from International Searching Authority (Japan Patent Office) in International Pat. Appl. No. PCT/JP2017/006472, dated May 30, 2017.

* cited by examiner

FIG. 5

| PATH POINT ID | ANGLE OF ENTRANCE [rad] | LATITUDE (DEGREE) | LONGITUDE (DEGREE) | VEHICLE SPEED (km/h) | DIRECTION OF TRAVEL | PASSENGER | ARBITRATION | STOPPING | GARAGE | POWER CHARGING SPOT |
|---|---|---|---|---|---|---|---|---|---|---|
| P0 | $\alpha 1$ | x1 | y1 | 0 | fwd | BOARDING/ UNBOARDING | NO | TEMPORARY STOPPING | NO | NO |
| P1 | $\alpha 2$ | x2 | y2 | 5 | fwd | NO | CONFIRM | TEMPORARY STOPPING | NO | NO |
| P2 | $\alpha 3$ | x3 | y3 | 10 | fwd | NO | START | PROHIBITED | NO | NO |
| P3 | $\alpha 4$ | x4 | y4 | 20 | fwd | NO | END | PROHIBITED | NO | NO |
| P4 | $\alpha 5$ | x5 | y5 | 30 | fwd | NO | NO | PROHIBITED | NO | NO |
| P5 | $\alpha 6$ | x6 | y6 | 10 | fwd | NO | NO | PROHIBITED | GARAGED | YES |
| ... | ... | ... | ... | ... | ... | ... | ... | ... | ... | ... |

| PATH POINT ID | ANGLE OF ENTRANCE [rad] | LATITUDE (DEGREE) | LONGITUDE (DEGREE) | VEHICLE SPEED (km/h) | DIRECTION OF TRAVEL | PASSENGER | ARBITRATION | STOPPING | GARAGE | POWER CHARGING SPOT |
|---|---|---|---|---|---|---|---|---|---|---|
| ... | ... | ... | ... | ... | ... | ... | ... | ... | ... | ... |
| P10 | $\alpha 11$ | x11 | y11 | 40 | fwd | NO | NO | PROHIBITED | NO | NO |
| ... | ... | ... | ... | ... | ... | ... | ... | ... | ... | ... |
| P20 | $\alpha 12$ | x12 | y12 | 40 | fwd | NO | NO | PROHIBITED | NO | NO |
| ... | ... | ... | ... | ... | ... | ... | ... | ... | ... | ... |
| P30 | $\alpha 13$ | x13 | y13 | 40 | fwd | NO | NO | PROHIBITED | NO | NO |
| ... | ... | ... | ... | ... | ... | ... | ... | ... | ... | ... |
| P40 | $\alpha 14$ | x14 | y14 | 40 | fwd | NO | NO | PROHIBITED | NO | NO |
| ... | ... | ... | ... | ... | ... | ... | ... | ... | ... | ... |

FIG. 7B

| PATH POINT ID | ANGLE OF ENTRANCE [rad] | LATITUDE (DEGREE) | LONGITUDE (DEGREE) | VEHICLE SPEED (km/h) | DIRECTION OF TRAVEL | PASSENGER | ARBITRATION | STOPPING | GARAGE | POWER CHARGING SPOT |
|---|---|---|---|---|---|---|---|---|---|---|
| ... | ... | ... | ... | ... | ... | ... | ... | ... | ... | ... |
| P11 | α21 | x21 | y21 | 30 | fwd | NO | NO | PROHIBITED | NO | NO |
| P12 | α22 | x22 | y22 | 30 | fwd | NO | NO | PROHIBITED | NO | NO |
| P13 | α23 | x23 | y23 | 30 | fwd | NO | NO | PROHIBITED | NO | NO |
| ... | ... | ... | ... | ... | ... | ... | ... | ... | ... | ... |
| P20 | α24 | x24 | y24 | 30 | fwd | NO | NO | PROHIBITED | NO | NO |
| ... | ... | ... | ... | ... | ... | ... | ... | ... | ... | ... |
| P31 | α25 | x25 | y25 | 35 | fwd | NO | NO | PROHIBITED | NO | NO |
| P32 | α26 | x26 | y26 | 35 | fwd | NO | NO | PROHIBITED | NO | NO |
| ... | ... | ... | ... | ... | ... | ... | ... | ... | ... | ... |
| P41 | α27 | x27 | y27 | 30 | fwd | NO | NO | PROHIBITED | NO | NO |
| P42 | α28 | x28 | y28 | 30 | fwd | NO | NO | PROHIBITED | NO | NO |
| P43 | α29 | x29 | y29 | 35 | fwd | NO | NO | PROHIBITED | NO | NO |
| ... | ... | ... | ... | ... | ... | ... | ... | ... | ... | ... |

FIG. 8

| VEHICLE ID | VEHICLE MODEL | VEHICLE NAME | VEHICLE NUMBER | VEHICLE LENGTH (mm) | VEHICLE WIDTH (mm) | VEHICLE HEIGHT (mm) | WEIGHT (kg) | PASSENGER CAPACITY | DATE OF REGISTRATION | DATE OF UPDATE |
|---|---|---|---|---|---|---|---|---|---|---|
| 1 | AZ-1 | ZZZ | 00 | 4820 | 1765 | 1445 | 1510 | 5 | 2015/4/1 | 2016/1/1 |
| 2 | BY-2 | YYY | 01 | 4820 | 1765 | 1445 | 1510 | 5 | 2015/8/8 | 2015/8/8 |
| 3 | BY-2 | XXX | 02 | 4240 | 1775 | 1320 | 1230 | 4 | 2015/10/10 | 2015/10/10 |

FIG. 9

| VEHICLE ID | STATE | STATE REPORTED FROM VEHICLE | LATITUDE (DEGREE) | LONGITUDE (DEGREE) | ANGLE OF ENTRANCE [rad] | SPEED (km/h) | DIRECTION OF TRAVEL | REMAINING AMOUNT OF CHARGE (%) | MALFUNCTION INFORMATION | LAST PASSING PATH POINT | PATH POINT AT START LOCATION | PATH POINT AT DESTINATION |
|---|---|---|---|---|---|---|---|---|---|---|---|---|
| 1 | STANDBY | STOPPING | x31 | y31 | 0 | 0 | FWD | 100 | NULL | PXX | PXX | PXX |
| 2 | TRANSPORT | DRIVING | x32 | y32 | 0 | 5 | FWD | 100 | NULL | PXX | PXX | PXX |
| 3 | TRANSPORT | DRIVING | x33 | y33 | 4.58 | 5 | FWD | 80 | NULL | PXX | PXX | PXX |

FIG. 11A

| PATH POINT ID | ANGLE OF ENTRANCE [rad] | LATITUDE (DEGREE) | LONGITUDE (DEGREE) | VEHICLE SPEED (km/h) | DIRECTION OF TRAVEL | PASSENGER | ARBITRATION | STOPPING | GARAGE | POWER CHARGING SPOT |
|---|---|---|---|---|---|---|---|---|---|---|
| ... | ... | ... | ... | ... | ... | ... | ... | ... | ... | ... |
| P10 | α11 | x11 | y11 | 40 | fwd | NO | NO | PROHIBITED | NO | NO |
| ... | ... | ... | ... | ... | ... | ... | ... | ... | ... | ... |
| P20 | α12 | x12 | y12 | 40 | fwd | NO | NO | PROHIBITED | NO | NO |
| ... | ... | ... | ... | ... | ... | ... | ... | ... | ... | ... |
| P30 | α13 | x13 | y13 | 40 | fwd | NO | NO | PROHIBITED | NO | NO |
| P301 | α131 | x131 | y131 | 35 | fwd | NO | NO | PROHIBITED | NO | NO |
| P302 | α132 | x132 | y132 | 35 | fwd | NO | NO | PROHIBITED | NO | NO |
| P303 | α133 | x133 | y133 | 35 | fwd | NO | NO | PROHIBITED | NO | NO |
| P40 | α14 | x14 | y14 | 40 | fwd | NO | NO | PROHIBITED | NO | NO |
| ... | ... | ... | ... | ... | ... | ... | ... | ... | ... | ... |

FIG. 11B

| PATH POINT ID | ANGLE OF ENTRANCE [rad] | LATITUDE (DEGREE) | LONGITUDE (DEGREE) | VEHICLE SPEED (km/h) | DIRECTION OF TRAVEL | PASSENGER | ARBITRATION | STOPPING | GARAGE | POWER CHARGING SPOT |
|---|---|---|---|---|---|---|---|---|---|---|
| ... | ... | ... | ... | ... | ... | ... | ... | ... | ... | ... |
| P11 | α21 | x21 | y21 | 30 | fwd | NO | NO | PROHIBITED | NO | NO |
| P12 | α22 | x22 | y22 | 30 | fwd | NO | NO | PROHIBITED | NO | NO |
| P13 | α23 | x23 | y23 | 30 | fwd | NO | NO | PROHIBITED | NO | NO |
| ... | ... | ... | ... | ... | ... | ... | ... | ... | ... | ... |
| P20 | α24 | x24 | y24 | 30 | fwd | NO | NO | PROHIBITED | NO | NO |
| ... | ... | ... | ... | ... | ... | ... | ... | ... | ... | ... |
| P31 | α25 | x25 | y25 | 35 | fwd | NO | NO | PROHIBITED | NO | NO |
| P32 | α26 | x26 | y26 | 35 | fwd | NO | NO | PROHIBITED | NO | NO |
| P321 | α261 | x261 | y261 | 30 | fwd | NO | NO | PROHIBITED | NO | NO |
| P322 | α262 | x262 | y262 | 30 | fwd | NO | NO | PROHIBITED | NO | NO |
| P323 | α263 | x263 | y263 | 30 | fwd | NO | NO | PROHIBITED | NO | NO |
| P41 | α27 | x27 | y27 | 30 | fwd | NO | NO | PROHIBITED | NO | NO |
| P42 | α28 | x28 | y28 | 30 | fwd | NO | NO | PROHIBITED | NO | NO |
| P43 | α29 | x29 | y29 | 35 | fwd | NO | NO | PROHIBITED | NO | NO |
| ... | ... | ... | ... | ... | ... | ... | ... | ... | ... | ... |

FIG. 14A

| PATH POINT ID | ANGLE OF ENTRANCE [rad] | LATITUDE (DEGREE) | LONGITUDE (DEGREE) | VEHICLE SPEED (km/h) | DIRECTION OF TRAVEL | PASSENGER | ARBITRATION | STOPPING | GARAGE | POWER CHARGING SPOT |
|---|---|---|---|---|---|---|---|---|---|---|
| P41 | α41 | x41 | y41 | 0 | fwd | NO | NO | PROHIBITED | NO | NO |
| P42 | α42 | x42 | y42 | 40 | fwd | NO | NO | PROHIBITED | NO | NO |
| P43 | α43 | x43 | y43 | 40 | fwd | NO | NO | PROHIBITED | NO | NO |
| P44 | α44 | x44 | y44 | 40 | fwd | NO | NO | PROHIBITED | NO | NO |
| P45 | α45 | x45 | y45 | 40 | fwd | NO | NO | PROHIBITED | NO | NO |
| P46 | α46 | x46 | y46 | 40 | fwd | NO | NO | PROHIBITED | NO | NO |
| P47 | α47 | x47 | y47 | 0 | fwd | NO | NO | PROHIBITED | NO | NO |

FIG. 14B

| PATH POINT ID | ANGLE OF ENTRANCE [rad] | LATITUDE (DEGREE) | LONGITUDE (DEGREE) | VEHICLE SPEED (km/h) | DIRECTION OF TRAVEL | PASSENGER | ARBITRATION | STOPPING | GARAGE | POWER CHARGING SPOT |
|---|---|---|---|---|---|---|---|---|---|---|
| P41 | α41 | x41 | y41 | 0 | fwd | NO | NO | PROHIBITED | NO | NO |
| P42 | α42 | x42 | y42 | 40 | fwd | NO | CONFIRM | TEMPORARY STOPPING | NO | NO |
| P51 | α51 | x51 | y51 | 40 | fwd | NO | START | PROHIBITED | NO | NO |
| P52 | α52 | x52 | y52 | 50 | fwd | NO | NO | PROHIBITED | NO | NO |
| P53 | α53 | x53 | y53 | 40 | fwd | NO | END | NO | NO | NO |
| P54 | α54 | x54 | y54 | 40 | fwd | NO | NO | TEMPORARY STOPPING | NO | NO |
| P45 | α45 | x45 | y45 | 40 | fwd | NO | NO | PROHIBITED | NO | NO |
| P46 | α46 | x46 | y46 | 40 | fwd | NO | NO | PROHIBITED | NO | NO |
| P47 | α47 | x47 | y47 | 0 | fwd | NO | NO | PROHIBITED | NO | NO |

| VEHICLE ID | STATE | LATITUDE (DEGREE) | LONGITUDE (DEGREE) | ANGLE OF ENTRANCE [rad] | REMAINING AMOUNT OF CHARGE (%) | MALFUNCTION INFORMATION |
|---|---|---|---|---|---|---|
| 1 | DRIVING | x | y | rad | 90 | NULL |

| VEHICLE ID | CONTENT OF CONTROL | PARAMETER |
|---|---|---|
| 0 | PARKING | GARAGED |

FIG. 28

| VEHICLE ID | VEHICLE MODEL | VEHICLE NAME | VEHICLE TYPE | VEHICLE NUMBER | VEHICLE LENGTH (mm) | VEHICLE WIDTH (mm) | VEHICLE HEIGHT (mm) | WEIGHT (kg) | PASSENGER CAPACITY | DATE OF REGISTRATION | DATE OF UPDATE |
|---|---|---|---|---|---|---|---|---|---|---|---|
| 1 | AZ-1 | ZZZ | ORDINARY VEHICLE | 00 | 4820 | 1765 | 1445 | 1510 | 5 | 2015/4/1 | 2016/1/1 |
| 2 | BY-2 | YYY | ORDINARY VEHICLE | 01 | 4820 | 1765 | 1445 | 1510 | 5 | 2015/8/8 | 2015/8/8 |
| 3 | BY-2 | XXX | ORDINARY VEHICLE | 02 | 4240 | 1775 | 1320 | 1230 | 4 | 2015/10/10 | 2015/10/10 |
| 4 | BY-1 | XYZ | EMERGENCY VEHICLE | 99 | 5354 | 1810 | 2490 | 2880 | 8 | 2015/1/1 | 2015/1/1 |

AUTOMATIC VEHICLE DISPATCHING SYSTEM AND SERVER DEVICE

CROSS REFERENCE TO RELATED APPLICATIONS

This application is a U.S. continuation application of PCT International Patent Application Number PCT/JP2017/006472 filed on Feb. 22, 2017, claiming the benefit of priority of Japanese Patent Application Number 2016-047714 filed on Mar. 11, 2016, the entire contents of which are hereby incorporated by reference.

BACKGROUND

1. Technical Field

The present disclosure relates to an automatic vehicle dispatching system that controls the movements of a plurality of automatic vehicles, and the like.

2. Description of the Related Art

Japanese Unexamined Patent Application Publication No. H11-184521 discloses an automatic vehicle dispatching system that dispatches an automatic vehicle by determining a drive route for the automatic vehicle to drive from the current location to a designated destination based on the map of the area, changing beacons according to the route, and performing autonomous drive control to make the automatic vehicle autonomous to drive along the drive route based on the beacons so as to cause the automatic vehicle to perform an unmanned operation.

SUMMARY

The present disclosure provides an automatic vehicle dispatching system that dispatches a plurality of automatic vehicles and performs drive control according to road conditions.

An automatic vehicle dispatching system according to the present disclosure is an automatic vehicle dispatching system including: a plurality of automatic vehicles; and a server device that performs communication with the plurality of automatic vehicles, wherein the server device includes: a server communicator that performs communication with the plurality of automatic vehicles; a server storage that stores: (i) area information that includes a plurality of path points in a predetermined area that indicate a drive route for the plurality of automatic vehicles, each of the plurality of path points including driving attributes that represent an automatic vehicle movement state on the drive route; and (ii) vehicle information that indicates a vehicle attribute of each of the plurality of automatic vehicles; and a route searcher that generates, for each of the plurality of automatic vehicles, first route information that includes a plurality of path points selected from among the plurality of path points of the area information according to the vehicle information that corresponds to the automatic vehicle, the first route information indicating a first drive route for the automatic vehicle, each of the plurality of automatic vehicles includes: a vehicle communicator that acquires the first route information generated by the route searcher for the automatic vehicle by performing wireless communication with the server device; and a drive controller that causes the automatic vehicle to drive based on the first route information acquired by the vehicle communicator, the driving attributes include a position of the path point, a vehicle speed when passing through the path point, an angle of entrance for a vehicle to enter, and a vehicle travel direction, and the vehicle attribute includes, for each of the plurality of automatic vehicles, a vehicle length, a vehicle width, a weight, and a vehicle model of the automatic vehicle.

According to the present disclosure, it is possible to dispatch a plurality of automatic vehicles and perform drive control according to road conditions.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 is a diagram showing an example of the area information and the path points stored in the storage provided in the server device;

FIG. 7A is a schematic diagram showing an example of the first route information included in the route information that is stored in the storage provided in the server device;

FIG. 7B is a schematic diagram showing another example of the first route information included in the route information that is stored in the storage provided in the server device;

FIG. 8 is a diagram showing an example of vehicle information that is stored in the storage provided in the server device and the storage provided in the automatic vehicle;

FIG. 9 is a diagram showing an example of vehicle state information that is stored, in the storage provided in the server device;

FIG. 11A is a diagram showing an example of the drive information that is stored in the storage provided in the automatic vehicle;

FIG. 11B is a diagram showing another example of the drive information that is stored in the storage provided in the automatic vehicle;

FIG. 14A is a diagram showing an example of first route information regarding drive route RA1 generated by a route searcher;

FIG. 14B is a diagram showing an example of first route information regarding drive route RA2 generated by the route searcher;

FIG. 28 is a diagram showing an example of vehicle information according to Additional Embodiment (A);

DETAILED DESCRIPTION OF THE EMBODIMENTS

Hereinafter, embodiments will be described in detail with reference to the drawings as appropriate. However, an excessively detailed description may be omitted. For example, a detailed description of already well-known matters and an overlapping description of substantially the same structural elements may be omitted. This is to avoid the following description from being unnecessarily lengthy and to facilitate the understanding of a person having ordinary skill in the art. Note that the inventors provide the following description and the accompanying drawings in order to allow a person having ordinary skill in the art to sufficiently understand the present disclosure, and thus the description and the drawings are not intended to limit the subject matter recited in the claims.

The numerical values, structural elements, the arrangement and connection of the structural elements, steps, the order of the steps, and the like shown in the following embodiments are merely examples, and therefore are not intended to limit the scope of the present disclosure. In addition, the diagrams are schematic representations, and thus are not necessarily true to scale. Also, in the embodiments given below, the term "position" refers to a combination of a latitude (degree) and a longitude (degree).

Embodiment 1

Hereinafter, automatic vehicle dispatching system 1 according to Embodiment 1 will be described with reference to the drawings.

[1-1. Configuration of Automatic Vehicle Dispatching System 1]

[1-1-1. Overall Configuration of Automatic Vehicle Dispatching System 1]

Figure 1:
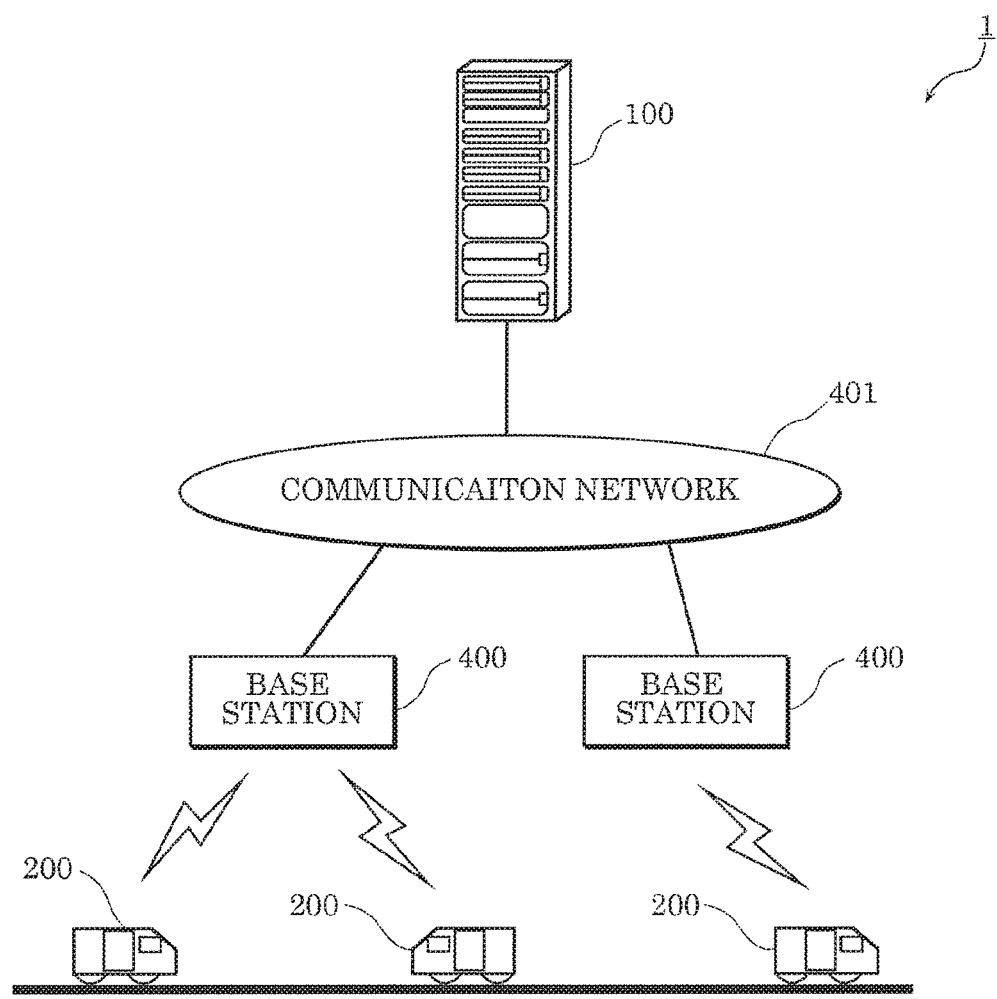
FIG. 1 is a schematic diagram schematically showing an automatic vehicle dispatching system according to Embodiment 1.

FIG. 1 is a schematic diagram schematically showing automatic vehicle dispatching system 1 according to Embodiment 1.

Referring to FIG. 1, automatic vehicle dispatching system 1 includes server device 100, a plurality of automatic vehicles 200, and at least one base station 400. Server device 100 and base station 400 are connected to communication network 401. Base station 400 corresponds to a relay station.

Server device 100 performs communication with automatic, vehicles 200 via communication network 401 and base station 400, and controls the movements of automatic vehicles 200. Each automatic vehicle 200 is a vehicle that carries a user(s) in a predetermined area, and automatically drives to a destination while carrying the user(s). Each automatic vehicle 200 includes a battery device (not shown), and performs operation by using energy supplied from the battery device. Base station 400 is a device that relays communication between automatic vehicles 200 and server device 100. Base station 400 performs communication with automatic vehicles 200 through wireless communication. Also, base station 400 performs communication with server device 100 via communication network 401.

A wireless LAN (Local Area Network) such as Wi-Fi® (Wireless Fidelity) may be used for the wireless communication between base station 400 and automatic vehicles 200. It is also possible to use other wireless communication methods. The Internet may be used as communication network 401 between base station 400 and server device 100. The communication between base station 400 and communication network 401 and between server device 100 and communication network 401 may be performed through wireless communication or wired communication such as a wireless LAN or a wired LAN.

[1-1-2. Configuration of Server Device 100]

A configuration of server device 100 according to the present embodiment will be described. Server device 100 is a structural element that searches for an available drive route for each of the plurality of automatic vehicles 200 to drive in a predetermined area, and manages the operation of each automatic vehicle 200. Also, server device 100 periodically receives, from each automatic vehicle 200, information that includes the vehicle position, the remaining amount of charge, malfunction information, and the like, and then performs the following operations based on the received information: correcting the drive route for automatic vehicle 200 so as to correspond to the information, controlling the operation of automatic vehicle 200, and the like.

Figure 2:
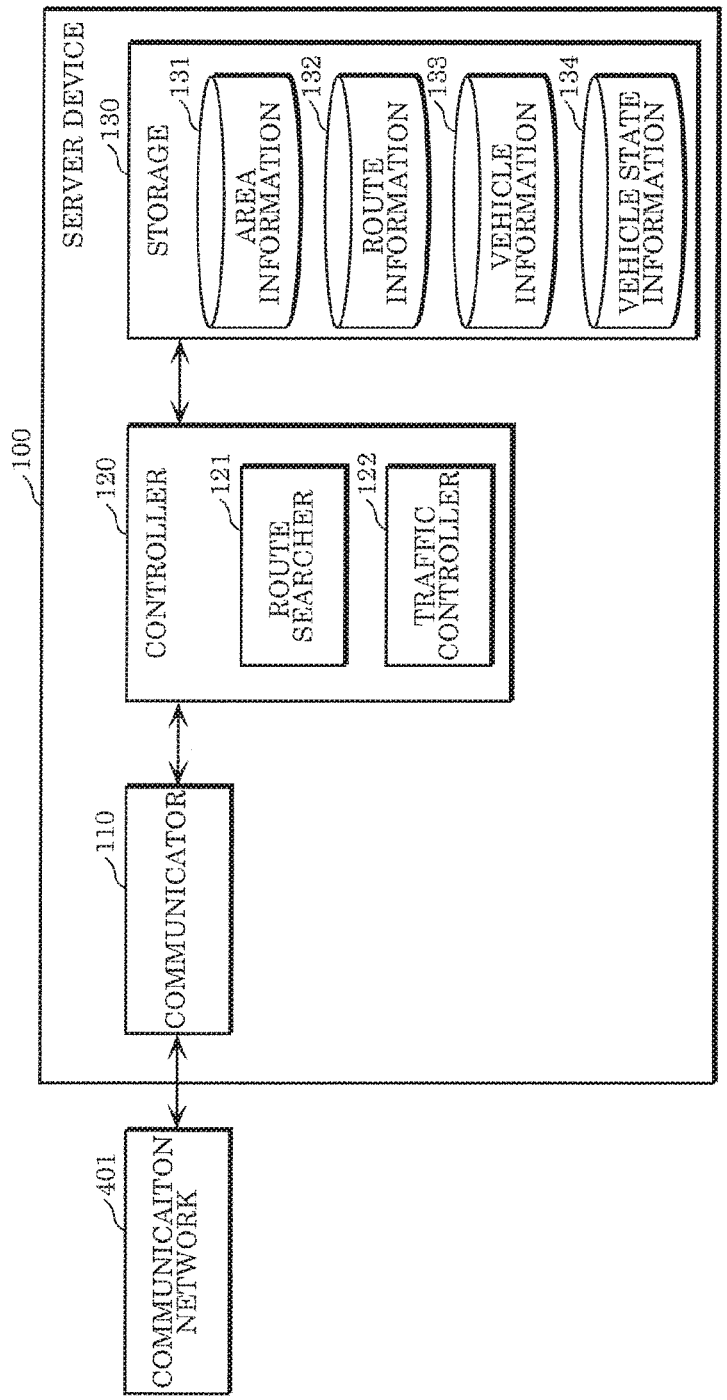
FIG. 2 is a block diagram schematically showing a configuration of a server device shown in FIG. 1.

FIG. 2 is a block diagram schematically showing a configuration of server device 100 shown in FIG. 1.

Referring to FIG. 1, server device 100 includes communicator 110, controller 120, and storage 130. Controller 120 includes route searcher 121. Controller 120 may further include traffic controller 122. Storage 130 stores area information 131 and vehicle state information 134. Storage 130 may further store route information 132 and vehicle information 133. Route information 132 corresponds to total route information. Server device 100 may be an information processing device such as a computer. Server device 100 may include one or more server devices, and may constitute a cloud system.

Communicator 110 is a structural element that performs communication with automatic vehicles 200, and the like. Communicator 110 corresponds to a server communicator. Communicator 110 may be a communication instrument, a processing circuit including a communication interface, or the like. Communicator 110 performs communication with automatic vehicles 200, and the like via communication network 401 under control of controller 120. To be specific, communicator 110 establishes a connection with communication network 401 through wired communication or wireless communication, and performs communication with automatic vehicles 200 via communication network 401 and base station 400. Communicator 110 may acquire, from the plurality of automatic vehicles, vehicle state information regarding the state of the plurality of automatic vehicles including the position of the plurality of automatic vehicles 200. Communicator 110 may be configured to transmit the received information to either of controller 120 and storage 130, and may be configured to receive information from either of controller 120 and storage 130, and transmit the received information.

Controller 120 may be implemented in any way as ion, as a control function of controlling server device 100 as a whole is included. For example, controller 120 may be implemented by dedicated hardware. Also, for example, controller 120 may be implemented by executing a software program suitable for each structural element. In this case, controller 120 may include, for example, a processor (not shown), and a storage (not shown) in which a control program is stored. As the processor, a MPU (Micro Processing Unit), a CPU (Central Processing Unit), or the like may be used, for example. The storage may be a memory, for example. Controller 120 may be implemented by a single controller that performs centralized control, or may be implemented by a plurality of controllers that perform distributed control by working in cooperation with each other.

Controller 120 can perform operations such as receiving information transmitted from communicator 110, storing information into storage 130, reading information stored in storage 130, and the like. To be specific, controller 120 controls communicator 110 so as to perform transmission and reception of information to and from base station 400 via communication network 401. That is controller 120 controls communicator 110 so as to perform transmission and reception of information to and from each automatic vehicle 200 via communication network 401 and base station 400. Controller 120 is configured to receive information transmitted periodically from each automatic vehicle 200, and transmit information such as route information generated for each automatic vehicle 200, and an operation instruction for automatic vehicle 200, to automatic vehicle 200 where necessary.

Controller 120 causes storage 130 to store information such as information received from each automatic vehicle 200, and route information for automatic vehicle 200 generated as a result of route search performed by route searcher 121, and updates area information 131, route information 132, vehicle state information 134, and the like stored in storage 130 with new information.

Controller 120 controls route searcher 121 to search for a drive route that needs to be set in each automatic vehicle 200. Upon receiving an input of the start location and/or the destination location of automatic vehicle 200 via communicator 110, route searcher 121 searches for a drive route for automatic vehicle 200 based on area information 131. For example, route searcher 121 searches for a drive route from the start location of automatic vehicle 200 or the current position of automatic vehicle 200 to the destination. Then, route searcher 121 generates first route information by changing the parameters of driving attributes according to vehicle information 133, the driving attributes that represent the automatic vehicle movement state on the drive route found as a result of search. Route searcher 121 reflects the generated first route information in route information 132 stored in storage 130. A detailed route search operation performed by route searcher 121 will be described later.

Controller 120 controls traffic controller 122 to operate each automatic vehicle 200 based on route information 132 and the like stored in storage 130. Traffic controller 122 transmits route information 132 stored in storage 130 to automatic vehicle 200. Traffic controller 122 may transmit, to automatic vehicle 200, only route information of automatic vehicle 200 that is the transmission destination from among route information 132, or may transmit all of route information 132 to automatic vehicle 200. That is, traffic controller 122 transmits at least route information that includes route information of automatic vehicle 200 that is the transmission destination from among route information 132. Automatic vehicle 200 drives (moves) according to the received route information. Upon receiving an arbitration request from automatic vehicle 200 that is about to enter an arbitration area, which will be described later, traffic controller 122 determines, based on vehicle state information 134 and route information 132, whether or not there is a possibility of occurrence of an interference between the plurality of automatic vehicles 200 during driving. If it is determined that there is the possibility of occurrence of the interference, traffic controller 122 may control the timing of entering the arbitration area for automatic vehicle 200 that has the possibility of the interference. If, on the other hand, it is determined that there is no possibility of occurrence of the interference between the plurality of automatic vehicles 200 during driving, traffic controller 122 may permit automatic vehicle 200 that transmitted the arbitration request to enter the arbitration area.

Also, upon receiving obstacle information regarding the presence or absence of an obstacle around the automatic vehicle and the position of the obstacle from automatic vehicle 200, traffic controller 122 determines an operation that needs to be performed by automatic vehicle 200, and provides an instruction to automatic vehicle 200 based on the determined operation. At this time, a drive instruction to change the drive speed of automatic vehicle 200 may be transmitted to automatic vehicle 200 such that the obstacle can be avoided. Instead of or in addition to the above, traffic controller 122 may control route searcher 121 to search again for a drive route that can avoid the obstacle so as to change the drive route and transmit the changed route information to automatic vehicle 200.

Storage 130 is a structural element that stores various types of information. Storage 130 corresponds to a server storage. Storage 130 may be a semiconductor memory or the like, or may be a volatile memory, a non-volatile memory, or the like. Also, storage 130 may be a read-only memory, or in other words, a non-rewritable memory. Storage 130 may be a built-in storage provided in server device 100, or may be provided in a cloud server to which server device 100 can access. Storage 130 stores area information 131 regarding a drive route for an automatic vehicle to drive in a predetermined area, and vehicle information 133 indicating the a vehicle attribute of each automatic vehicle 200, which will be described later. Storage 130 may store the first route information of each of the plurality of automatic vehicles 200 generated by route searcher 121, as route information 132. Storage 130 may store vehicle state information 134 acquired by communicator 110.

[1-1-3. Configuration of Automatic Vehicle 200]

Figure 3:
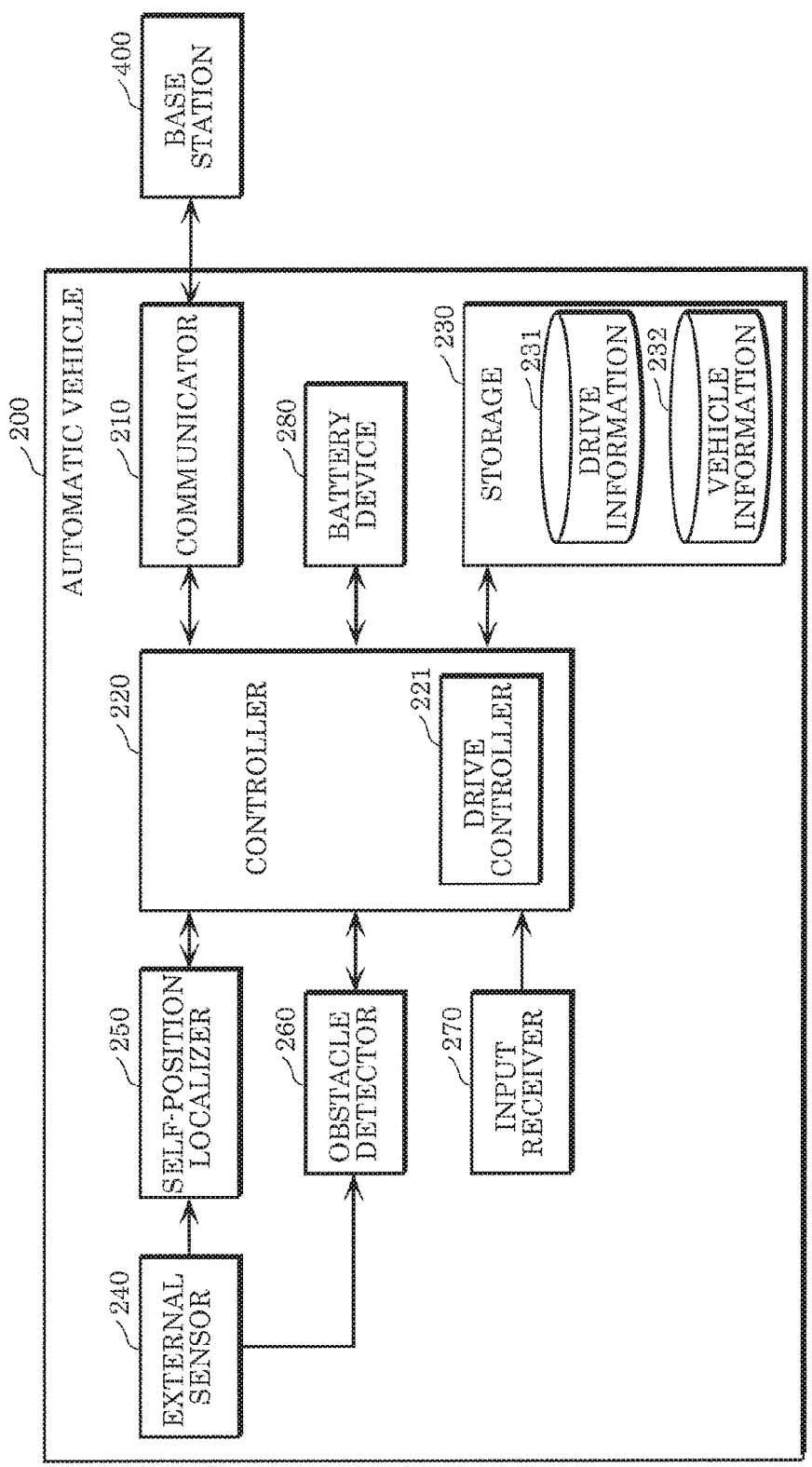
FIG. 3 is a block diagram schematically showing a configuration of an automatic vehicle shown in FIG. 1.

FIG. 3 is a block diagram schematically showing a relationship of structural elements of automatic vehicle 200 shown in FIG. 1.

Referring to FIG. 3, automatic vehicle 200 includes communicator 210 and controller 220. Automatic vehicle 200 may further include storage 230, external sensor 240, self-position localizer 250, obstacle detector 260, and input receiver 270. Controller 220 includes drive controller 221. Also, storage 230 stores drive information 231, vehicle information 232, and the like.

Communicator 210 is a structural element that performs communication with server device 100, and the like. Communicator 210 corresponds to a vehicle communicator. Communicator 210 may be a communication instrument, a processing circuit including a communication, interface, or the like. Communicator 210 performs communication with server device 100 and the like via base station 400 under control of controller 220. To be specific, communicator 210 establishes a connection with base station 400 through wireless communication, and performs communication with server device 100 via communication network 401. For example, communicator 210 acquires first mute information of automatic vehicle 200 generated by route searcher 121 by performing wireless communication with server device 100. Communicator 210 may be configured to transmit the received information to either of controller 220 and storage 230, and may be configured to receive information from either of controller 220 and storage 230, and transmit the received information.

Controller 220 may be implemented in any way as long as a control function of controlling automatic vehicle 200 as a whole is included. For example, controller 220 may be implemented by dedicated hardware. Also, for example, controller 220 may be implemented by executing a software program suitable for each structural element. In this case, controller 220 may include, for example, a processor (not shown), and a storage (not shown) in which a control program is stored. As the processor, a MPU (Micro Processing Unit), a CPU (Central Processing Unit), or the like may be used, for example. The storage may be a memory, for example. Controller 220 may be implemented by a single controller that performs centralized control, or may be implemented by a plurality of controllers that perform distributed control by working in cooperation with each other.

Controller 220 can perform operations such as controlling communicator 210, external sensor 240, self-position localizes 250, obstacle detector 260, and battery device 280, receiving input from input receiver 270, storing information in storage 230, reading information stored in storage 230, and the like.

To be specific, controller 220 controls external sensor 240 to scan in the direction of travel of automatic vehicle 200. External sensor 240 transmits the result of detection to self position localizer 250 and obstacle detector 260. External sensor 240 may transmit the result of detection to at least one of controller 220 and storage 230 instead of to self-position localizer 250 and obstacle detector 260, or may transmit the result of detection to at least one of controller 220 and storage 230 in addition to self-position localizer 250 and obstacle detector 260.

Controller 220 causes self-position localizer 250 to localize the position and orientation of automatic vehicle 200 based on the result of detection performed by external sensor 240, and acquires the result of localization. Self-position localizer 250 may transmit the result of localization to storage 230 instead of to controller 220, or may transmit the result of localization to storage 230 in addition to controller 220.

Controller 220 causes obstacle detector 260 to generate obstacle information based on the result of detection performed by external sensor 240, and the like, the obstacle information being information regarding the presence or absence of an obstacle around automatic vehicle 200 and the position of the obstacle, and the like, and acquires the obstacle information. Obstacle detector 260 may transmit the obstacle information to storage 230 instead of to controller 220, or may transmit the obstacle information to storage 230 in addition to controller 220. An obstacle indicated by the obstacle information may be automatic vehicle 200 other than automatic vehicle 200 to which the obstacle detector belongs. Also, controller 220 may control automatic vehicle 200 to stop upon detection of an obstacle on or near the drive route of automatic vehicle 200. After that, controller 220 may control automatic vehicle 200 to start driving if the obstacle is no longer detected on or near the drive route by external sensor 240. Alternatively, controller 220 may generate drive information based on the route information received from server device 100, and control the operation of automatic vehicle 200.

Controller 220 controls communicator 210 to perform transmission and reception of information with respect to base station 400. That is, controller 220 controls communicator 210 to perform transmission and reception of information with respect to server device 100 via base station 400. For example, controller 220 may be configured to control communicator 210 to transmit vehicle state information of automatic vehicle 200 including the position, orientation, and movement state of automatic vehicle 200, obstacle information regarding an obstacle around automatic vehicle 200, and the like periodically, for example, every second to server device 100.

Drive controller 221 generates drive information, which will be described later, from the first route information of automatic vehicle 200 received from server device 100, and stores the generated drive information in storage 230. That is, drive controller 221 controls its automatic vehicle to drive based on the first route information acquired by communicator 210. For example, drive controller 221 may add additional path points to a second drive route indicated by a plurality of path points of the first route information according to vehicle information 232 stored in storage 230, and control its automatic vehicle to drive based on the drive information obtained as a result of addition of the additional path points. Drive controller 221 controls its automatic vehicle to drive according to the drive information stored in storage 230. Drive controller 221 includes a VCU (Vehicle Control Unit), and motors that control steering, speed, braking, and the like.

Also, if it is determined that one of the path points of the first route information has an arbitration attribute (described later) that indicates that the path point is a path point prior to an arbitration area (described later), drive controller 221 may control its automatic vehicle to stop, and transmit an arbitration request to server device 100.

Storage 230 is a structural element that stores various types of information. Storage 230 corresponds to a vehicle storage. Storage 230 may be a semiconductor memory or the like, or may be a volatile memory, a non-volatile memory, or the like. Also, storage 230 may be a read-only memory, or in other words, a non-rewritable memory. Storage 230 stores drive information 231, which will be described later. Also, storage 230 stores vehicle information 232 of its automatic vehicle.

External sensor 240 is a structural element that detects the presence or absence of an object around automatic vehicle 200. External sensor 240 is, for example, a millimeter wave radar.

Self-position localizer 250 is a structural element that localizes the position of automatic vehicle 200. Self-position localizer 250 may have the same configuration as that of controller 220 described above, or may be included in controller 220. Self-position localizer 250 detects the position and orientation of automatic vehicle 200 based on the result of detection performed by external sensor 240.

Automatic vehicle 200 may include an acceleration sensor, an angular sensor (also called a gyroscope sensor), and the like, and self-position localizer 250 may detect the position and orientation of automatic vehicle 200 by also using the result of detection performed by the above-described sensor. With this configuration, the accuracy of detection of the position and orientation of automatic vehicle 200 is improved. Self-position localizer 250 may determine the driving trajectory and attitude angle, or in other words, turn angle of automatic vehicle 200 based on the result of detection performed by the acceleration sensor and the angular sensor. Alternatively, automatic vehicle 200 may include a GPS receiver, and may be configured to receive self-position information of automatic vehicle 200.

Obstacle detector 260 is a structural element that detects an obstacle on a drive route. Obstacle detector 260 may have the same configuration as that of controller 220 described above, or may be included in controller 220. Obstacle detector 260 detects the position of the object detected by external sensor 240 based on the result of detection performed by external sensor 240, and the result of detection of the position and orientation of automatic vehicle 200 performed by self-position localizer 250. Obstacle detector 260 transmits obstacle information that includes information regarding the detected obstacle and position information regarding the position of the detected obstacle to at least one of controller 220 and storage 230. That is, obstacle detector 260 generates obstacle information that includes information indicating the presence or absence of an object around automatic vehicle 200 and the position of the object based on the result of detection performed by external sensor 240, and outputs the generated obstacle information. Then, drive controller 221 may control its automatic vehicle to stop if obstacle detector 260 detects that there is an object on the first drive route, and transmit obstacle information to server device 100. Self-position localizes 250 may acquire the obstacle information output by obstacle detector 260, and use the obstacle information for feedback to detect the position and orientation of automatic vehicle 200.

External sensor 240 may be implemented by a camera that captures the surrounding area of automatic vehicle 200, and obstacle detector 260 may be implemented by an image processor that detects an object around automatic vehicle 200 by image processing images captured by the camera that constitutes external sensor 240.

Input receiver 270 is a structural element that receives an input of destination and the like from a user riding on automatic vehicle 200. In the present embodiment, input receiver 270 may include a touch panel, a key board, and the like. The information, including the destination and the like indicated by the input received by input receiver 270 is transmitted to server device 100 by communicator 210.

Battery device 280 supplies energy for driving automatic vehicle 200.

[1-1-4. Area Information]

Figure 4:
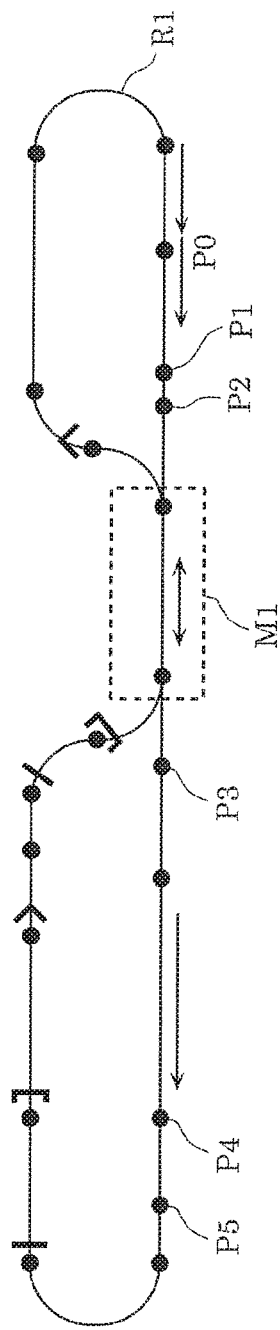
FIG. 4 is a schematic diagram showing area information and path points that are stored in a storage provided, in the server device.

FIG. 4 is a schematic diagram showing a plurality of path points that constitute area information 131 stored in storage 130 of server device 100. FIG. 5 is a diagram showing an example of a plurality of path points 135 that constitute area information 131 that is stored in storage 130 of server device 100. For the sake of clarity, in FIG. 4, the direction of travel along the drive route is indicated by arrows.

Referring to FIG. 4, area information 131 is information indicating a drive route for automatic vehicles 200 to drive in a predetermined area. Area information 131 is composed of a set of a plurality of path points indicated by black circles on drive route R1 along which automatic vehicles 200 can drive. The path points indicate the points of change of movement of automatic vehicles 200 on drive route R1. The path points each include information such as the position of the path point, the vehicle speed of automatic vehicle 200 passing through the path point, the angle of entrance for automatic vehicle 200 to enter, the direction of travel of automatic vehicle 200, and the like, in FIG. 4, area information 131 of drive route R1 is composed of twenty path points.

Referring to FIG. 5, each of the plurality of path points 135 includes driving attributes that indicate the angle [rad] of entrance when passing through the path point, the position (latitude and longitude) of the path point, the expected speed [km/h] of automatic vehicle 200 when passing through the path point, the direction of travel (forward movement or backward movement) when passing through the path point, the allowance (boarding or unboarding) for passengers, arbitration (confirm, start, or end), stopping (stopping, temporary stopping, or stopping prohibited), the presence or absence of garaging (garaged or out-of-garage), the presence or absence of a power charging spot, and the like. In FIG. 5, the direction of travel is indicated by fwd (forward movement).

In FIGS. 4 and 5, path points that constitute a feature of the present disclosure will be described. For example, path point P0 having a path point ID of P0 is a path point where the automatic vehicle temporarily stops to allow a passenger to board or unboard. Hereinafter, a path point having a path point ID of Pn (where n is an integer of 0 or more) is represented by path point Pn.

The dotted frame shown in FIG. 4 indicates arbitration area M1. Arbitration area M1 is an area that is provided in a segment in which when a plurality of automatic vehicles 200 drive, there is a possibility of occurrence of an interference between the plurality of automatic vehicles 200 during driving. Server device 100 controls the plurality of automatic vehicles 200 to drive in the arbitration area. As used herein, the expression "there is a possibility of occurrence of an interference between the plurality of automatic vehicles 200 during driving" means, for example, that there is a possibility that automatic vehicles 200 will collide with each other. For example, the drive route of arbitration area M1 is a bidirectional roadway, and is a segment in which there is a possibility that automatic vehicle 200 driving from right side of FIG. 4 along the drive route of arbitration area M1 and automatic vehicle 200 driving from left side of FIG. 4 along the drive route of arbitration area M1 will collide with each other. With respect to path points prior to arbitration area M1, "start" is set as the arbitration attribute. Also, with respect to path points subsequent to arbitration area M1, "end" is set as the arbitration attribute.

In the case of arbitration area M1, "start" is set with respect to path point P2 as the arbitration attribute. Path point P2 is a path point that triggers server device 100 to start an arbitration for driving. Also, "end" is set with respect to path point P3 as the arbitration attribute. Path point P3 is a path point where server device 100 ends the arbitration for driving. Also, "confirm" is set with respect to a path point prior to path point P2 as the arbitration attribute. For example, in the case of arbitration area M1, "confirm" is set with respect to path point P1 as the arbitration attribute. In this case, automatic vehicle 200 temporarily stops at path point P1, and transmits an arbitration request to server device 100. Automatic vehicle 200 stands by at path point P1 until automatic vehicle 200 receives a drive instruction from server device 100. As described above, each of the plurality of path points includes an arbitration attribute that at least indicates that the path point is a path point prior to an arbitration area that is a segment that is on the first drive route and in which there is a possibility of the occurrence of an interference between the plurality of automatic vehicles 200 during driving.

Also, path point P4 indicates a path point where stopping is prohibited, and path point P5 indicates a path point where a vehicle drives into garage and stops driving.

[1-1-5. Route Information]

Figure 6A:
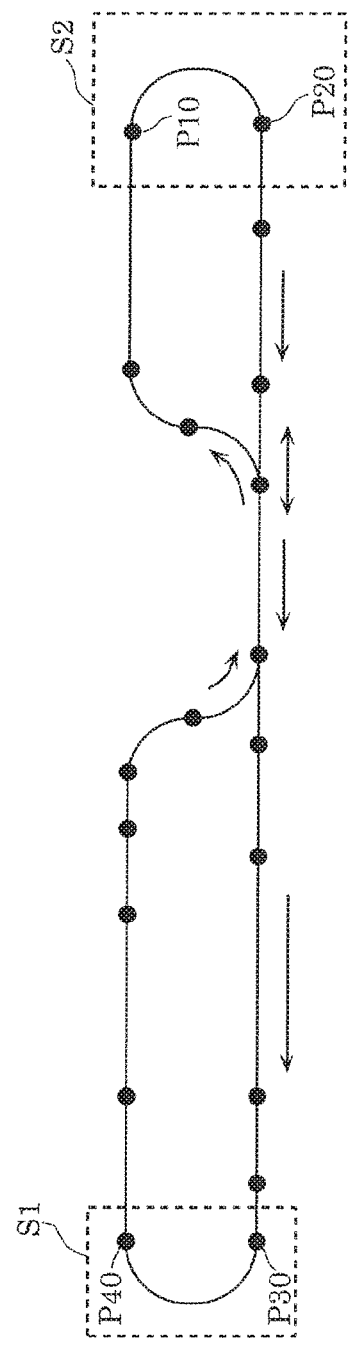
FIG. 6A is a schematic diagram showing an example of first route information included in route information that is stored in the storage provided in the server device.
Figure 6B:
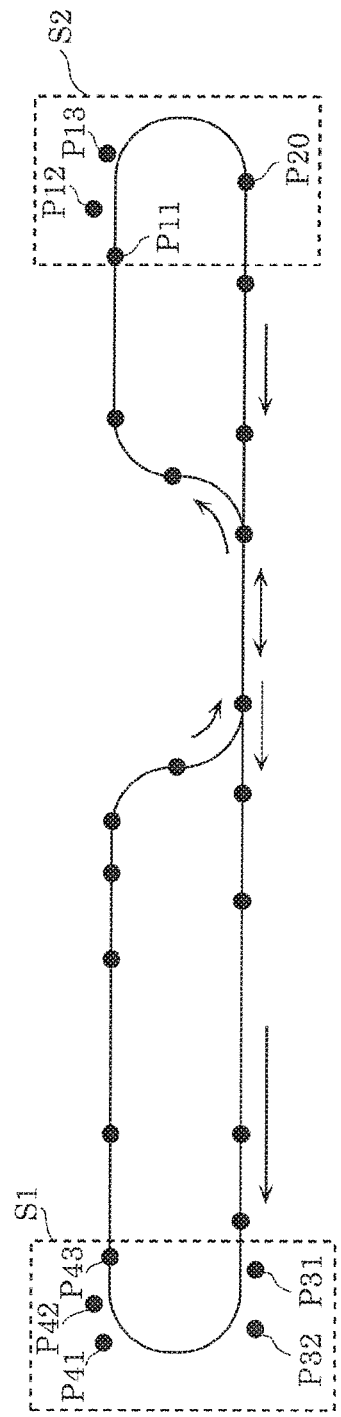
FIG. 6B is a schematic diagram showing another example of first route information included in the route information that is stored in the storage provided in the server device.

FIGS. 6A and 6B are schematic diagrams showing examples of first route information included in route information 132 stored in storage 130 of server device 100. FIG. 6A is a schematic diagram showing an example of first route information in the case where automatic vehicle 200 is a small-sized vehicle such as an ordinary user vehicle, the first route information corresponding to that shown in FIG. 4. FIG. 6B is a schematic diagram showing an example of first route information in the case where automatic vehicle 200 is a large-sized vehicle such as a truck or a bus. For the sake of clarity, in FIGS. 6A and 6B, the direction of travel along the drive route is indicated by arrows.

FIGS. 6A and 6B show first route information indicating a first drive route for automatic vehicle 200 to actually drive, the first drive route being included in drive route indicated by the area information shown in FIG. 4. The first drive route indicated by the first route information shown in FIG. 6A is the same as the drive route indicated by the area information shown in FIG. 4. However, the first drive route indicated by the first route information shown in FIG. 6B is different from the drive route indicated by the area information shown in FIG. 4 in that the number of path points in curved regions that are respectively surrounded by region S1 and region S2 indicated by dashed rectangles is different.

This is because in the case where an automatic vehicle drives along a curve, the drive route when the automatic vehicle actually drives along the curve varies depending on the vehicle length, vehicle width, and vehicle weight even if control is performed to drive at the same drive speed and the angle of entrance. For example, if drive control is performed on automatic vehicle 200 that is a large-sized vehicle based on the first route information shown in FIG. 6A, the large-sized vehicle may not be able to drive along the curves in region S1 and region S2. In order to avoid such a situation, server device 100 according to the present disclosure sets path points according to the a vehicle attribute of each of the plurality of automatic vehicles 200.

For example, in region S1 shown in FIG. 6A, one path point P30 is set at the start point of the curve, and one path point P40 is set at the end point of the curve. However, in region S1 shown in FIG. 6B, two path points P31 and P32 are set at the start point of the curve, and three path points P41, P42, and P43 are set at the end of the curve. Also, with respect to region 52, one path point P10 is set at the start point of the curve in FIG. 6A, whereas three path points P11, P12, and P13 are set in FIG. 6B.

The path points are set in the manner as described above by taking into consideration the fact that a large-sized vehicle is longer and wider than a small-sized vehicle, and thus is different in terms of the coasting distance before braking takes place, the centrifugal force generated when driving along the curve at the same speed, and the like. In the case shown in FIG. 6B where automatic vehicle 200 is a large-sized vehicle, the path points that are set on each curve are provided so as to form a curve larger than that in the case shown in FIG. 6A where automatic vehicle 200 is a small-sized vehicle.

FIGS. 7A and 7B are diagrams showing an example of first route information included in route information 132 stored in storage 130 of server device 100. FIG. 7A is a diagram showing first route information for a small-sized vehicle shown in FIG. 6A. FIG. 7B is a diagram showing first route information for a large-sized vehicle shown in FIG. 6B.

As shown in FIGS. 7A and 7B, the first route information is a set of a plurality of path points. Also, in route information 132, the number of path points and the parameters of the driving attributes of the path points are set differently according to the vehicle information even in the case where the automatic vehicles drive along the same drive route. In the first route information for a large-sized vehicle shown in FIG. 7B, more path points are set on each curve than those of the first route information for a small-sized vehicle shown in FIG. 7A. Also, in the path points that are set on each curve, the vehicle speed of the large-sized vehicle is set to be lower than that of the small-sized vehicle.

[1-1-6. Vehicle Information]

Vehicle information 133 and vehicle information 232 include automatic vehicle information regarding each of all automatic vehicles 200. Vehicle information 133 is information that indicates a vehicle attribute for each of the plurality of automatic vehicles 200.

FIG. 8 is a diagram showing an example of vehicle information stored in storage 130 of server device 100 and storage 230 of automatic vehicle 200.

As shown in FIG. 8, the vehicle information includes a vehicle ID for uniquely identifying vehicles, vehicle model, vehicle name, vehicle number, vehicle length [mm], vehicle width [mm], vehicle height [mm], weight [kg], the date of registration on which vehicle information was registered, the date of update on which the vehicle information was updated, and the like. Also, the vehicle information may further include information related to driving such as steering angle.

[1-1-7. Vehicle State Information]

Vehicle state information 134 is information that is transmitted periodically from automatic vehicle 200 to server device 100 and that indicates the current position and the current state of automatic vehicle 200, and the like, and includes identification information such as a vehicle ID for identifying automatic vehicle 200 corresponding to the information. In the present embodiment, automatic vehicle 200 transmits the above information periodically (for example, every second) to server device 100. In this way, server device 100 can acquire the state of automatic vehicle 200 substantially in real time.

FIG. 9 is a diagram showing an example of vehicle state information 134 stored in storage 130 of server device 100.

As shown in FIG. 9, the current position of automatic vehicle 200 is indicated by using a latitude (degree) and a longitude (degree). The vehicle state of automatic vehicle 200 includes the vehicle state managed by server device 100, the vehicle state notified from automatic vehicle 200 to server device 100, the angle [rad] of entrance when passing through a path point, the speed [km/h] when passing through the path point, the direction of travel. [forward movement or backward movement] when passing through the path point, the remaining amount of charge of battery device 280 [0 to 100%], malfunction information, the path point ID of the last passing path point, the path point ID of the path point at the start location, the path point ID of the path point at the destination, and the like. The malfunction information includes "NULL" (normal), "gear malfunction", "wheel malfunction", and the like.

The state managed by server device 100 and the state reported from automatic vehicle 200 may include "driving", "stopping", "transport", "time-out", "unboarding completed", "power charging", "emergency", "dispatched", and the like. To be more specific, "driving" may include auto-driving, auto-driving with a stopover, auto-driving with a changed destination, autonomous driving, manual driving, and the like. Likewise, "stopping" may include standby, destination arrived, temporary stopping, obstacle detected, garaging completed, out-of-garage, emergency stopping, and the like. Also, "transport" may include hoarding completed, unboarding completed, and the like.

[1-1-8. Drive Information]

Figure 10A:
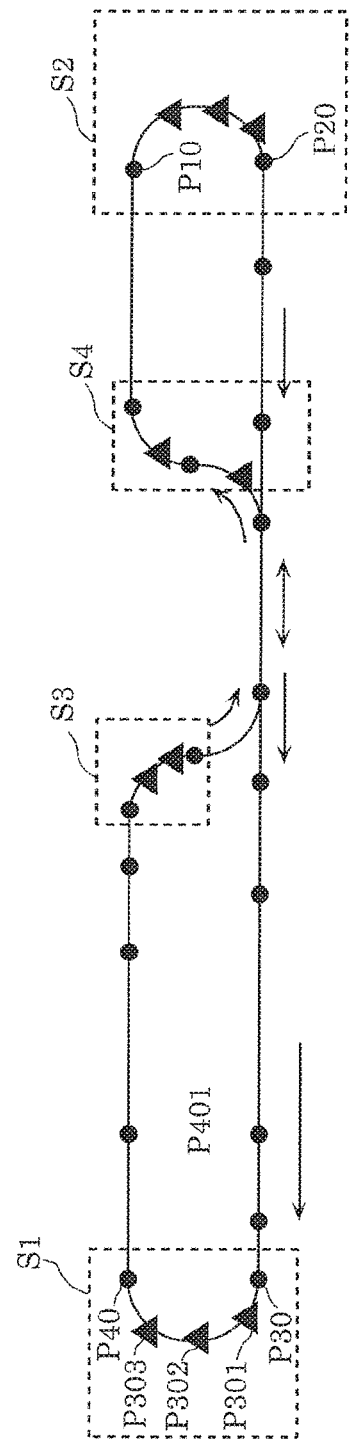
FIG. 10A is a schematic diagram showing an example of drive information that is stored in the storage provided in the automatic vehicle.
Figure 10B:
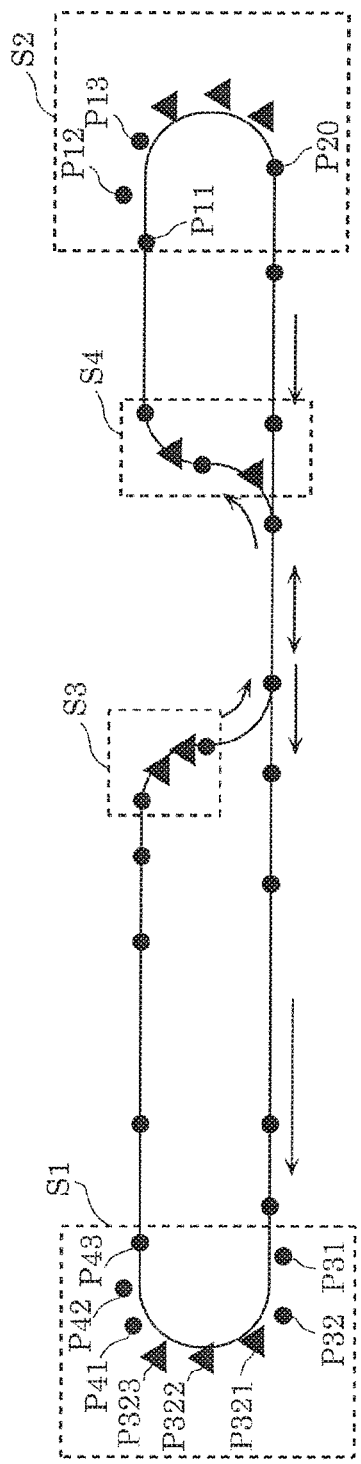
FIG. 10B is a schematic diagram showing another example of drive information that is stored in the storage provided in the automatic vehicle.

FIGS. 10A and 10B are schematic diagrams showing examples of drive information 231 stored in storage 230 of automatic vehicle 200. FIG. 10A is a schematic diagram showing an example of drive information in the case where automatic vehicle 200 is a small-sized vehicle such as an ordinary user vehicle. FIG. 10B is a schematic diagram showing an example of drive information in the case where automatic vehicle 200 is a large-sized vehicle such as a truck or a bus. For the sake of clarity, FIGS. 10A and 10B, the direction of travel along the drive route is indicated by arrows.

FIGS. 10A and 10B show drive information generated from the first route information shown in FIG. 6A and drive information generated from the first route information shown in FIG. 6B, respectively. In FIGS. 10A and 10B, black triangles in regions S1 to S4 indicated by dashed rectangles are path points added by drive controller 221. Regions S1 to S4 are all curve regions, Automatic vehicle 200 may perform further fine drive control in a region, such as a curve, where the drive route varies according to the vehicle attribute in the first route information generated by server device 100.

For example, in region S1 shown in FIG. 10A, new three path points P301, P302, and P303 are additionally set between two path points P30 and P40. Also, in region S1 shown in FIG. 10B, three path points P321, P322, and P323 are set between path points P32 and P41. Likewise, in each of regions S2 to S4 shown in FIGS. 10A and 10B, a plurality of path points are additionally set between two path points that are set on the curve among the path points of the first route information.

FIGS. 11A and 11B are diagrams showing an example of drive information 231 stored in storage 230 of automatic vehicle 200. FIG. 11A is a diagram showing the drive information shown in FIG. 10A. FIG. 11B is a diagram showing the drive information shown in FIG. 10B.

As shown in FIGS. 11A and 11B, the drive information is a set of a plurality of path points. It can be seen that in the drive information shower FIGS. 11A and 11B, the path points of region S1 have been added to the route information shown in FIGS. 7A and 7B. To be specific, as described above, path points are further added to a second drive route indicated by the plurality of path points of the first route information by drive controller 221 according to vehicle information 232 stored in storage 230.

[1-2. Operation of Automatic Vehicle Dispatching System 1]

[1-2-1. Route Search Operation for Automatic Vehicle 200 Performed by Server Device 100]

A route search operation for automatic vehicle 200 performed by server device 100, which is one of the operations of automatic vehicle dispatching system 1, will be described with reference to FIGS. 12, 13, 14A, and 14B.

Figure 12:
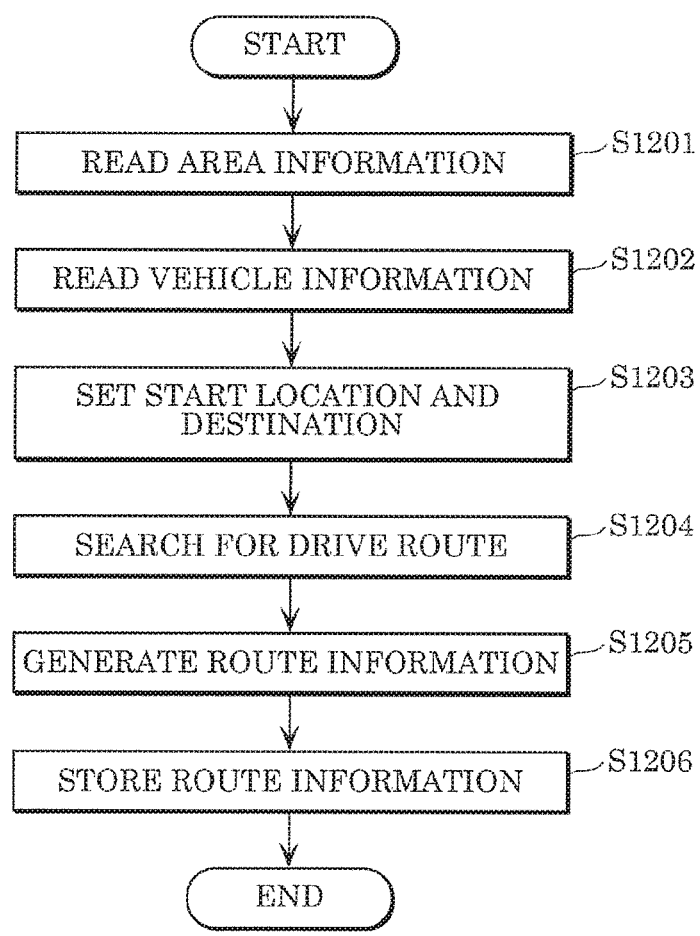
FIG. 12 is a flowchart illustrating a flow of a route search operation for the automatic vehicle that is performed by the server device.

FIG. 12 is a flowchart illustrating a flow of a route search operation for automatic vehicle 200 performed by server device 100.

Referring to FIG. 12, if it is determined that an instruction to set a drive route for automatic vehicle 200 has been received via communicator 110 of server device 100, or if it is determined that it is necessary to set a drive route for automatic vehicle 200 based on the obstacle information or the like, controller 120 of server device 100 causes route searcher 121 to perform a route search.

Route searcher 121 first reads area information 131 stored in storage 130 of server device 100 under control of controller 120 (step S1201).

Next, route searcher 121 reads vehicle information 133 and vehicle state information 134 stored in storage 130 (step S1202).

Next, route searcher 121 sets the start location and the destination of the drive route by using the path point IDs of the path points included in area information 131 (step S1203). The start location and the destination are set based on an instruction from controller 120 that received information regarding the start location and the destination via communicator 110.

Next, route searcher 121 searches for a drive route that conforms to the arrangement of path points connecting the start location and the destination by using area information 131 (step S1204).

Figure 13:
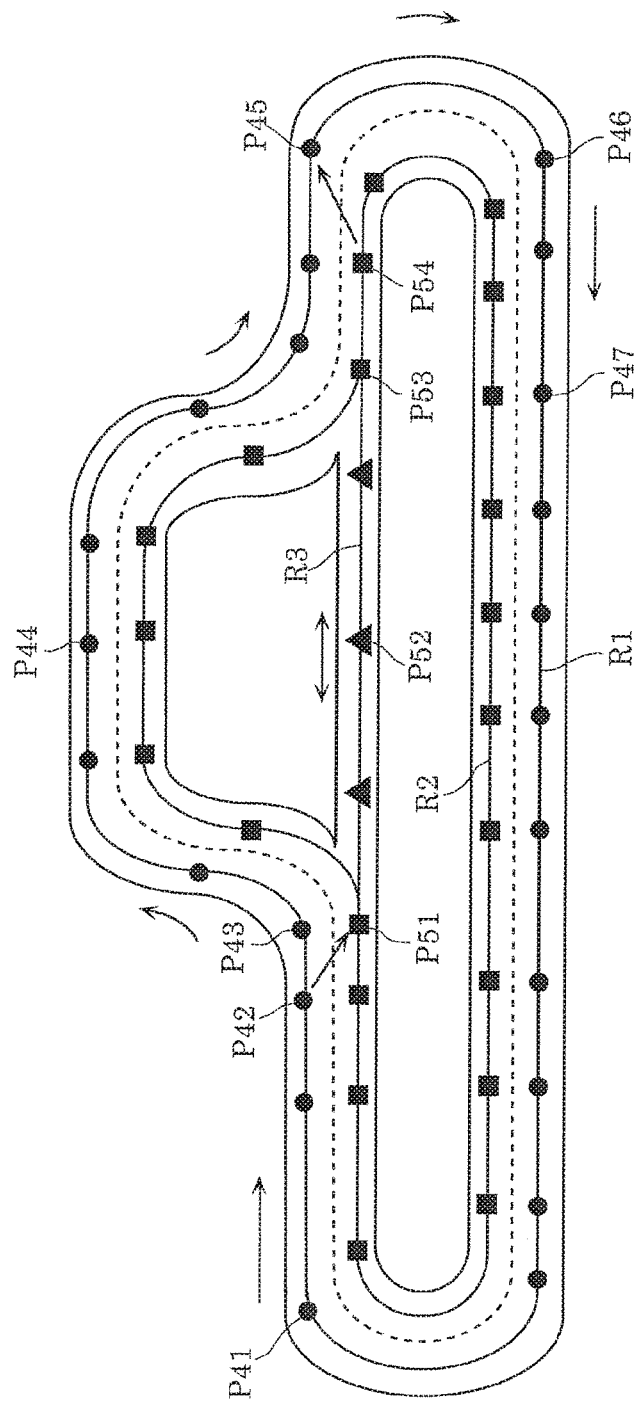
FIG. 13 is a diagram showing an example of a route search operation for the automatic vehicle that is performed by the server device.

FIG. 13 is a diagram showing an example of a route search operation for automatic vehicle 200 performed by server device 100.

In FIG. 13, black circles are path points that are set on drive route R1 that loops along the left lane in the direction of travel, black squares are path points that are set on drive route R2 that loops along the right lane in the direction of travel. Also, black triangles are path points that are set on drive route R3 along which only one vehicle is allowed to pass through. In FIG. 13, it is assumed that path point P41 is set as the start location, and path point P47 is set as the destination. In FIG. 13, reference numerals are given only to the path points that are used in the following description. For the sake of clarity, in FIG. 13, the direction of travel is indicated by arrows.

Route searcher 121 searches for a drive route from path point P41 indicating the start location and path point P47 indicating the destination. In this case, route searcher 121 finds two drive routes. First drive route RA1 is a route for the automatic vehicle to drive along drive route R1 from path point P41 to path point P47. For example, drive route RA1 can be indicated as follows: P41→P42→P43→P44→P45 P46→P47. Second drive route RA2 is a route for the automatic vehicle to drive along drive route R1 from path point P41 to path point P42, advance from path point P42 to path point 51 that is on drive route R2, and drive along drive route R3. After that, the automatic vehicle advances from path point P53 that is on drive route R2 to path point P45 that is on drive route R1, and drives again along drive route R1 to path point P47. Drive route RA2 can be indicated as follows: P41→P42→P51→P52→P53→P54→P45→P46→P47. In this way, route searcher 121 selects, for each of the plurality of automatic vehicles, a plurality of path points: P41→P42→P43→P44→P45→P46→P47 that indicate drive route RA1 for automatic vehicle 200 to drive from among the plurality of path points 135 of area information 131. Also, route searcher 121 may select, for each of the plurality of automatic vehicles, a plurality of path points: P41→P42→P51→P52→P53→P54→P45→P46→P47 that indicate drive route RA2 for automatic vehicle 200 to drive from among the plurality of path points 135 of area information 131.

Route searcher 121 determines an optimal drive route by taking into consideration each drive route, the state of other automatic vehicles 200, and the like. For example, if information indicating that there is an obstacle on drive route R3 is received, route searcher 121 selects drive route RA1.

Next, route searcher 121 generates first route information of the selected drive route (step S1205). Route searcher 121 generates first route information constituted by a plurality of path points selected according to the vehicle information of automatic vehicle 200. To be specific, route searcher 121 generates first route information based on the vehicle information for a small-sized vehicle, or the vehicle information for a large-sized vehicle. For example, route searcher 121 performs at least one of the following operations according to the vehicle information: (i) further adding additional path points to the first route information; and (ii) changing the parameters of the driving attributes of the plurality of path points selected in this way, route searcher 121 acquires path points selected from area information 131, sorts the path points in the driving order, and optionally changes the parameters of the attributes of the path points.

In this case, route searcher 121 generates first route information by using the area information of each of drive route drive route R2, and drive route R3 stored in area information 131. In the area information of each drive route, driving attributes for driving the drive route are set in advance.

Drive route RA1 is a drive route including a part of drive route Rt. Route searcher 121 acquires path points selected from drive route R1 stored in area information 131, sorts the selected path points in the driving order, and thereby creates the first route information regarding drive route RA1.

FIG. 14A is a diagram showing an example of first route information regarding drive route RA1 generated by route searcher 121.

As shown in FIG. 14A, in the first route information regarding drive route RA1, path points P41, P42, P43, P44, P45, P46, and P47 are stored in the driving order. In this case, route searcher 121 does not need to change the attributes of the path points.

Here, an example will be described assuming that route searcher 121 has selected drive route RA2. Route searcher 121 acquires path points that constitute drive route RB1 from the area information regarding drive route R1, drive route R2, and drive route R3 stored in area information 131, and sorts the acquired path points in the driving order. Here, in drive route R1, the path point next to path point P42 is path point P43, but in drive route RA2, the path point next to path point P42 is path point P51. Likewise, the path points next to path points P51 and P54 are different between drive route RA2 and drive route R2. Accordingly, it is necessary to change the angle of entrance at each of path points P42, P51, and P54. Route searcher 121 corrects the angle of entrance at each of path points P42, P51, and P54. In addition, route searcher 121 also corrects the vehicle speed at each of path points P42, P51, and P54 as necessary.

Furthermore, route searcher 121 determines that, in drive route R3 of drive route RA2, there is a possibility of occurrence of an interference between automatic vehicle 200 that drives on drive route RA2 and another automatic vehicle 200 that drives from the opposite direction, and sets drive route R3 as an arbitration area. Route searcher 121 sets path point P42 from which the automatic vehicle enters drive route R3 as an arbitration confirmation point, and sets path point P53 that is subsequent to the end point of drive route R3 as an arbitration end point. Also, route searcher 121 sets path point P42 immediately prior to path point P51 as a confirmation point, and sets "temporary stopping" in the stopping attribute.

In this case, route searcher 121 determines that, in a segment from path point P53 to path point P45 at which the vehicle returns to drive route R1 from drive route R2, there is a possibility of occurrence of an interference with other automatic vehicles 200 that drive on drive route R1 and drive route R2, respectively, and also sets this segment as an arbitration area. Route searcher 121 sets the path point immediately prior to path point P53 as an arbitration confirmation point, path point P53 as an arbitration start point, and path point P45 as an arbitration end point. Also, route searcher 121 sets the path point immediately prior to path point P53 as a confirmation point, and sets "temporary stopping" in the stopping attribute. In this case, the arbitration areas are continuous, and thus an arbitration request for the next arbitration area is made before the vehicle arrives at the end of the first arbitration area.

FIG. 14B is a diagram showing an example of first route information regarding drive route RA2 generated by the route searcher.

As shown in FIG. 14B, in the first route information regarding drive route RA2, path points P41, P42, P51, P52, P53, P54, P45, P46, and P47 are stored in the driving order. It can be seen that FIG. 14B is different from FIG. 14A in that path points P42 and P45 have different driving attributes from those of FIG. 14A. Also, with respect to path points P42, P51, and P53, "confirm", "start" and "end" are respectively set as the arbitration attribute.

Route searcher 121 stores and saves the created first route information in route information 132 (step S1206).

[1-2-2. Operations Performed by Server Device 101 and Automatic Vehicle 200 when Carrying User]

Operations performed by server device 100 and automatic vehicle 200 when carrying a user will be described. In this case, it is assumed that automatic vehicle 200 is in a normal driving state in which it is not interfered with another automatic vehicle 200 and an obstacle.

Figure 15:
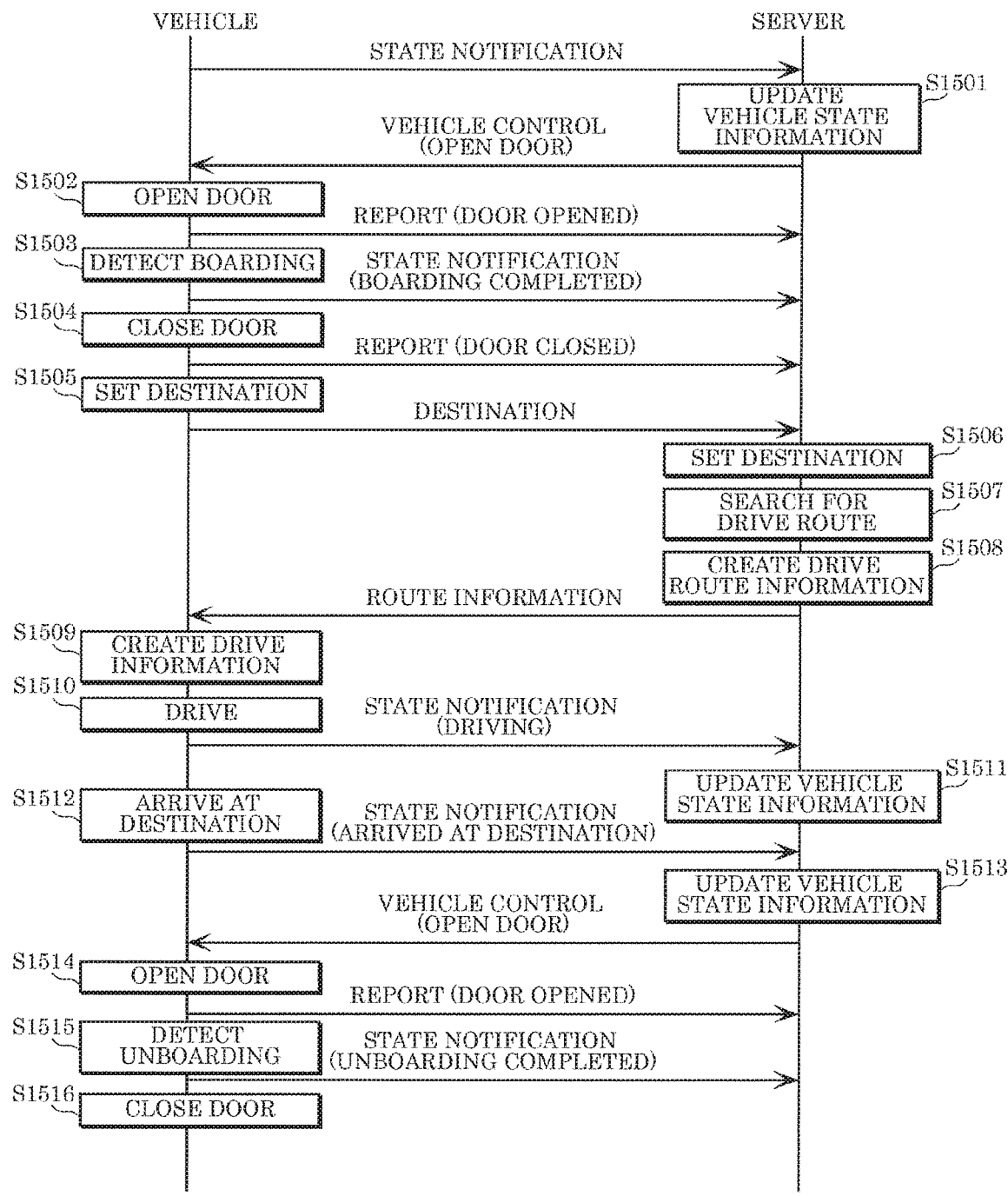
FIG. 15 is a sequence diagram showing a flow of operations performed by the server device and the automatic vehicle when carrying a user.

FIG. 15 is a sequence diagram showing a flow of operations performed by server device 100 and automatic vehicle 200 when carrying a user. FIG. 15 shows operations performed by server device 100 and automatic vehicle 200 when automatic vehicle 200 allows a user to board and carries the user to a designated destination.

Figures 16, 17, 18:
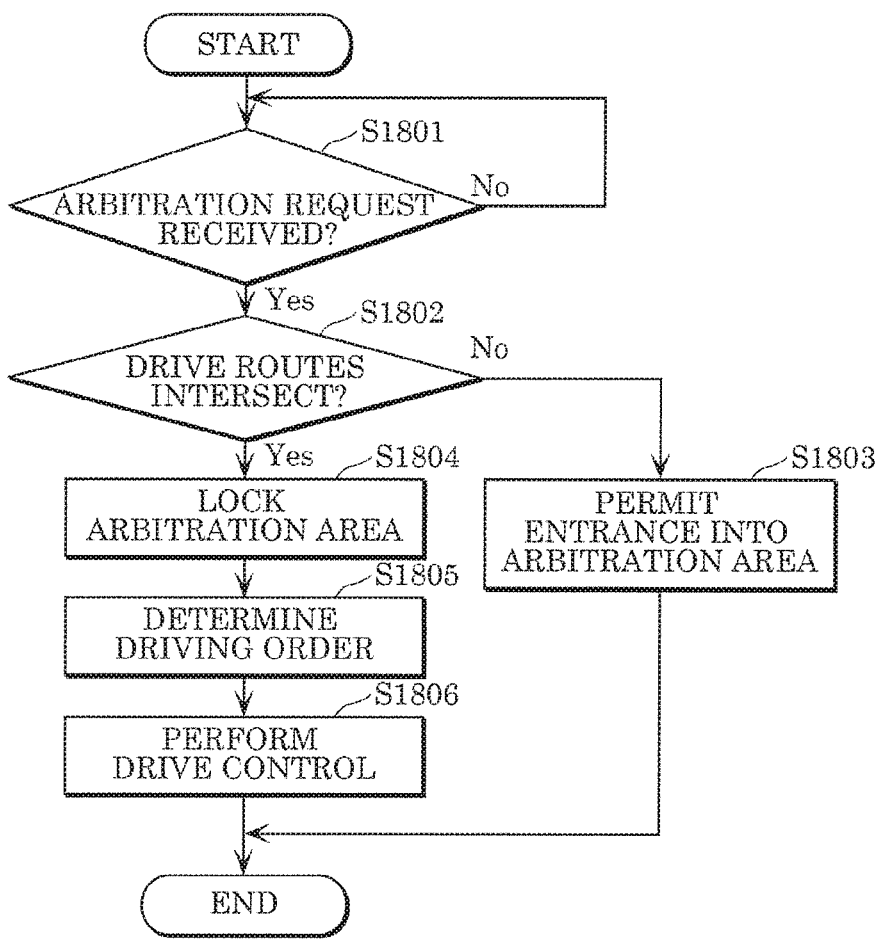
FIG. 16 is a diagram showing an example of a state notification transmitted from the automatic vehicle to the server device.
FIG. 17 is a diagram showing an example of vehicle control information transmitted from the server device to the automatic vehicle.
FIG. 18 is a flowchart illustrating a flow of an arbitration operation performed by a traffic controller provided in the server device.

The following description will be given with reference to mainly FIG. 15 among FIGS. 2, 3, 15, 16, and 17. Automatic vehicle 200 transmits a state notification indicating the state of the vehicle periodically (for example, every second) to server device 100 while automatic vehicle 200 is in operation. Also, when automatic vehicle 200 performs an operation under control of the server device, automatic vehicle 200 reports the result of the operation. FIG. 16 is a diagram showing an example of a state notification transmitted from automatic vehicle 200 to server device 100.

As shown in FIG. 16, the state notification includes a vehicle ID for uniquely identifying vehicles, a state that indicates the vehicle state, a latitude and a longitude that indicate the current position of the vehicle, the angle [rad] of entrance, the remaining amount of charge [%] of battery device 280, malfunction information, and the like.

As used herein, the term "state" includes "driving", "stopping", "boarding completed", "unboarding completed", "time-out", "power charging", "emergency", and the like. As used herein, "time-out" refers to, for example, a state in which no user boarded for a predetermined length of time after automatic vehicle 200 unlocked the door a state in which a user boarded but did not set a destination for a predetermined length of time, a state in which the user did not unboard for a predetermined length of time after arrival at the destination, or the like. The remaining amount of charge is information indicating the amount of charge remaining in battery device 280, which is represented by a value from 0 to 100%. The angle of entrance includes fwd (forward movement) and bwd (backward movement). The malfunction information includes "NULL" (normal), "gear malfunction", "w heel malfunction", and the like.

Controller 120 of server device 100 updates vehicle state information 134 stored in storage 130 shown in FIG. 9 by using the received state notification (step S1501).

Next, controller 121) of server device 100 transmits vehicle control information indicating an instruction to open a door to automatic vehicle 200.

FIG. 17 is a diagram showing an example of vehicle control information transmitted from server device 100 to automatic vehicle 200. As shown in FIG. 17, the vehicle control information includes a vehicle ID for uniquely identifying vehicles, the content of control, the parameter according to the content of control, and the like. The content of control includes power supply of vehicle (on or off), charging (start or stop), door lock (unlock or lock), door (open or close), driving (permitted or prohibited), stopping (emergency or temporary stop), backward movement, parking, avoidance of obstacle, and the like.

Upon receiving the vehicle control information indicating an instruction to open a door, controller 220 of automatic vehicle 200 opens the door. Controller 220 of automatic vehicle 200 transmits a report indicating that the door has opened to server device 100 (step S1502).

Upon detecting that a user(s) has boarded the vehicle, controller 220 of automatic vehicle 200 transmits a notification indicating the completion of boarding to server device 100 (step S1503).

Controller 120 of server device 100 updates the state of the automatic vehicle with "dispatched". Controller 220 of the automatic vehicle closes the door, and transmits a report indicating that the door has been closed to server device 100 (step S1504).

If, for example, the user sets a destination by using an input device (not shown) provided in automatic vehicle 200, controller 220 of automatic vehicle 200 transmits the input destination to server device 100 (step S1505). At this time, automatic vehicle 200 may also transmit information regarding the start location.

Controller 120 of server device 100 receives the information that; includes the destination. In the case where controller 120 of server device 100 has not received information regarding the start location, controller 120 of server device 100 sets the current position of automatic vehicle 200 as the start location, and causes route searcher 121 to search for a drive route that includes the start location and the destination in the manner as described above (steps S1506 and S1507).

Next, controller 120 of server device 100 causes route searcher 121 to create route information regarding the drive route found as a result of search, and stores the created route information in route information 132 in storage 130 (step S1508). Controller 120 of server device 100 causes traffic controller 122 to transmit the route information stored in route information 132 in storage 130 to automatic vehicle 200.

Controller 220 of automatic vehicle 200 that has received the route information causes drive controller 221 to create drive information in the manner as described above by using the received route information (step S1509). Drive controller 221 controls automatic vehicle 200 to drive according to the created drive information (step S1510).

Automatic vehicle 200 transmits a state notification periodically (for example, every second) to server device 100 while automatic vehicle 200 is driving on the drive route from the start point to the destination point, and controller 120 of server device 100 updates, each time it receives a state notification, vehicle state information 134 of automatic vehicle 200 stored in storage 130 by using the received state notification (step S1511). In response to automatic vehicle 200 starting driving while carrying the user, controller 120 of server device 100 updates the vehicle state with "transport".

When automatic vehicle 200 arrives at the destination, automatic vehicle 200 transmits a state notification indicating that it has arrived at the destination to server device 100 (step S1512).

Controller 120 of server device 100 receives the state notification, and updates vehicle state information 134 stored in storage 130 (step S1513). After that, controller 120 of server device 100 transmits vehicle control information indicating an instruction to open a door to automatic vehicle 200.

Upon receiving the vehicle control information indicating an instruction to open a door, controller 220 of automatic vehicle 200 opens the door. Controller 220 of automatic vehicle 200 transmits a report indicating that the door has opened to server device 100 (step S1514).

Upon detecting that the user(s) has unboarded the vehicle, controller 220 of automatic vehicle 200 transmits a notification indicating the completion of unboarding to server device 100 (step S1515).

Controller 120 of server device 100 updates the state of the automatic vehicle with "standby". Controller 220 of the automatic vehicle closes the door, and transmits a report indicating that the door has been closed to server device 100 (step S1516).

[1-2-3. Arbitration Operation of Server Device 100 Performed when Plurality of Automatic Vehicles 200 Enter Same Arbitration Area]

An arbitration operation of server device 100 performed when a plurality of automatic vehicles 200 enter the same arbitration area will be described.

FIG. 18 is a flowchart illustrating a flow of an arbitration operation performed by traffic controller 122 of server device 100.

Upon receiving an arbitration request, traffic controller 122 advances the processing to step S1802 (step S1801). Traffic controller 122 checks whether there is another automatic vehicle 200 that transmitted an arbitration request with respect to the same arbitration area. If it is determined that there is another automatic vehicle, traffic controller 122 checks whether the drive routes of the automatic vehicles intersect with each other in the arbitration area.

If it is determined that the drive routes do not intersect with each other, traffic controller 122 advances the processing to step S1803. If, on the other hand, it is determined that the drive routes intersect with each other, traffic controller 122 advances the processing to step S1804 (step S1802).

Here, a description win be given of a case where a plurality of drive routes intersect with each other in the arbitration area and a case where a plurality of drive routes do not intersect with each other in the arbitration area.

Figure 19A:
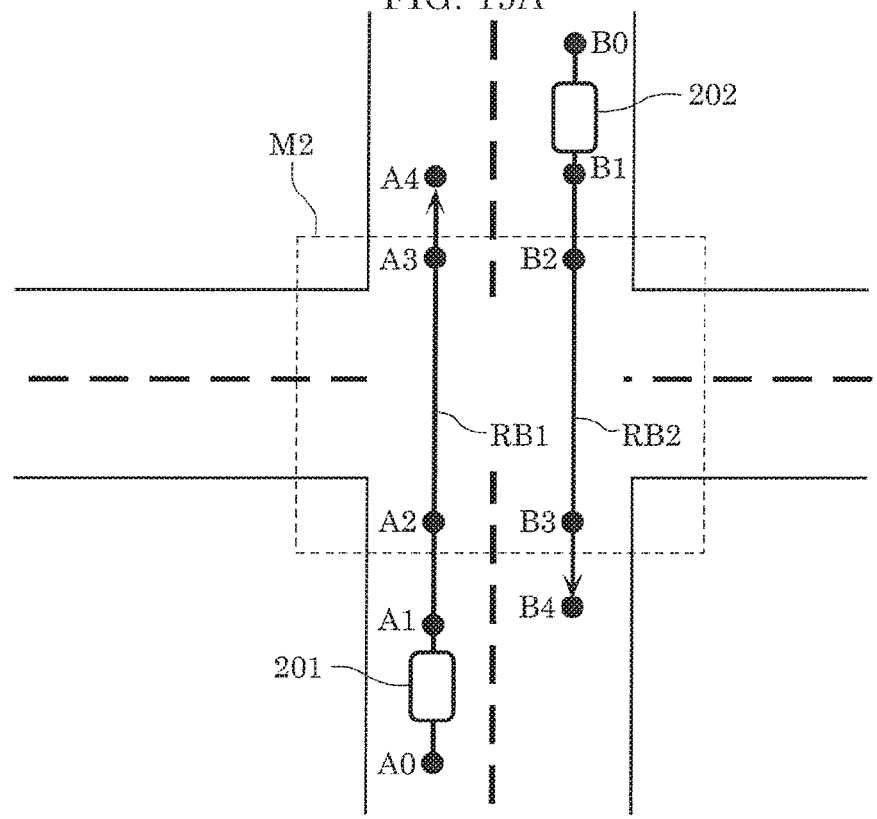
FIG. 19A is a diagram showing an example in which a plurality of drive routes do not intersect with each other in an arbitration area.

FIG. 19A is a diagram showing an example in which a plurality of drive routes do not intersect with each other in an arbitration area. FIG. 19A is a diagram showing a case where the drive routes of automatic vehicles 201 and 202 do not intersect with each other at an intersection in the arbitration area.

In FIG. 19A, arbitration area M2 is indicated by a dotted frame. Path points A1 and B1 are set as arbitration confirmation points, path points A2 and B2 are set as arbitration start points, and path points A3 and B3 are set as arbitration end points.

In FIG. 19A, it is assumed that with respect to automatic vehicle 201, drive route RB1 has been set that includes path points A0, A1, A2, A3, and A4 through which the vehicle is to travel in this order, with path point A0 being set as the start point. Likewise, it is also assumed that with respect to automatic vehicle 202, drive route RB2 has been set that includes path points B0, B1, B2, B3, and B4 through which the vehicle is to travel in this order, with path point B0 being set as the start point. In FIG. 19A, drive route RB1 and drive route RB2 do not intersect with each other. That is, an interference will not occur between automatic vehicles 201 and 202 during driving.

Figure 19B:
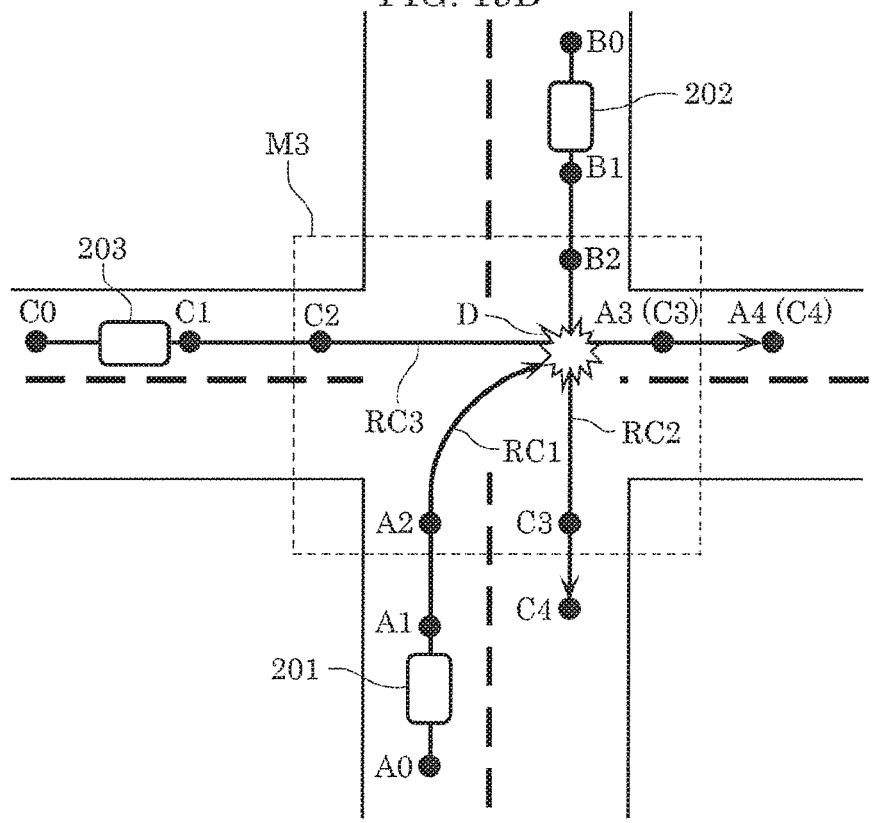
FIG. 19B is a diagram showing an example in which a plurality of drive routes intersect with each other in an arbitration area.

FIG. 19B is a diagram showing an example in which a plurality of drive routes intersect with each other in an arbitration area. FIG. 19B is a diagram showing a case where there is a possibility of occurrence of an interference between automatic vehicles 201, 202, and 203 during driving through an intersection. In FIG. 19B, arbitration area M3 is indicated by a dotted frame. Path points A1, B1, and C1 are set as arbitration confirmation points, path points A2, B2, and C2 are set as arbitration start points, and path points A3, B3, and C3 are set as arbitration end points.

In FIG. 19B, it is assumed that with respect to automatic vehicle 201, drive route RC1 has been set that includes path points A0, A1, A2, A3, and A4 through which the vehicle is to travel in this order, with path point A0 being set as the start point. Likewise, it is also assumed that with respect to automatic vehicle 202, drive route RC2 has been set that includes path points B0, B1, B2, B3, and B4 through which the vehicle is to travel in this order, with path point B0 being set as the start point. Furthermore, it is also assumed that with respect to automatic vehicle 203, drive route RC3 has been set that includes path points C0, C1, C2, C3, and C4 through which the vehicle is to travel in this order, with path point C0 being set as the start point. In FIG. 19B, drive route RC1, drive route RC2, and drive route RC3 intersect with each other at position D. That is, there is a possibility that automatic vehicles 201, 202, and 203 may interfere with each other during driving.

If it is determined that the drive routes do not intersect with each other, traffic controller 122 permits automatic vehicles 200 that transmitted arbitration requests to enter the arbitration area (step S1804).

If it is determined that the drive routes intersect with each other, traffic controller 122 locks automatic vehicles 200 that transmitted arbitration requests from entering the arbitration area (step S1805).

Traffic controller 122 determines the driving order of automatic vehicles 200 that transmitted arbitration requests (step S1803). The driving order is determined based on, for example, the order of reception of arbitration requests.

Traffic controller 122 controls the timing of entering the arbitration area for automatic vehicle 200 in the determined order (step S1804).

[1-2-4. Operation of Server Device 100 Performed when Plurality of Drive Routes do not Intersect in Arbitration Area]

Figure 20:
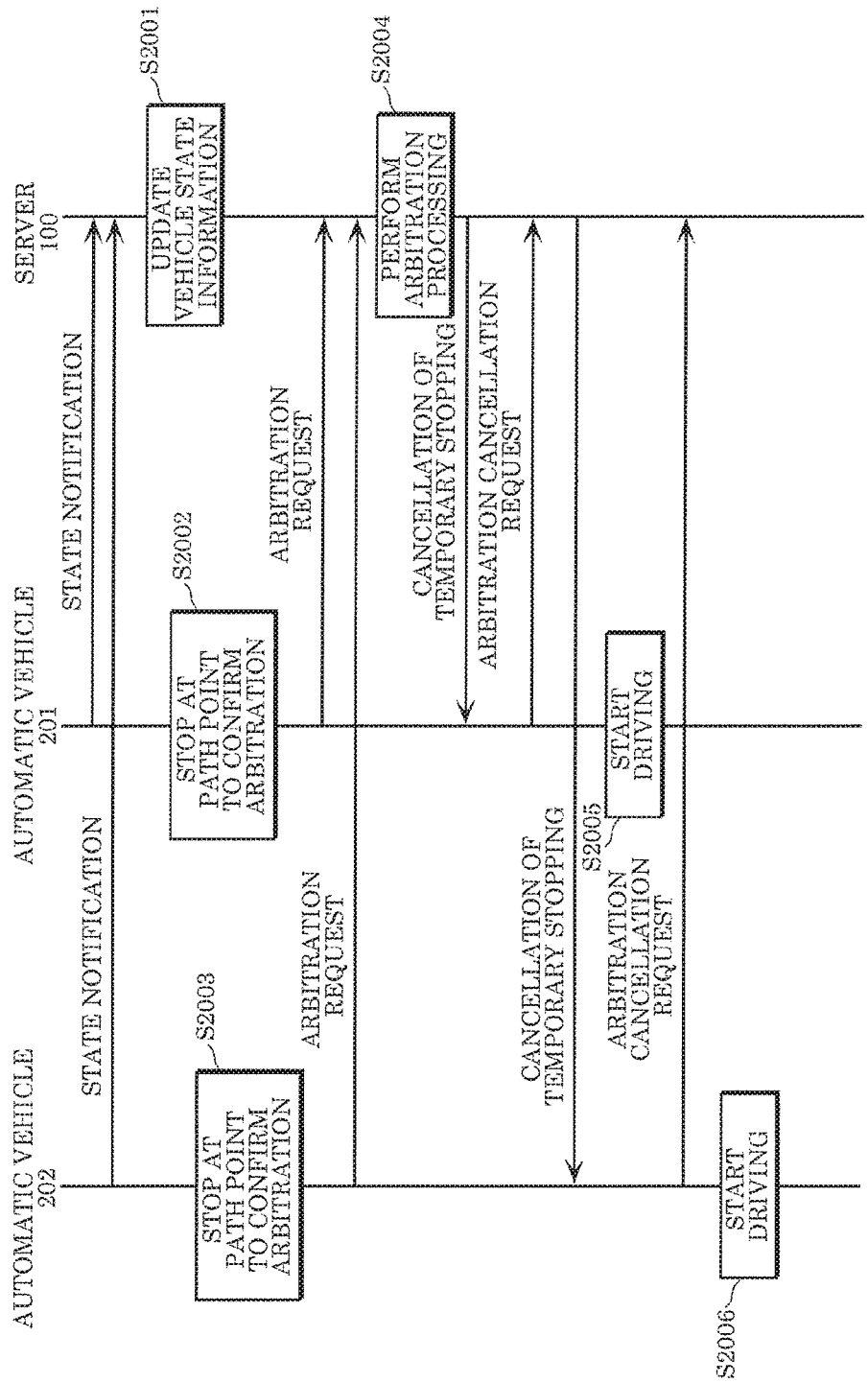
FIG. 20 is a sequence diagram showing an example of arbitration control performed by the server device when a plurality of drive routes do not intersect with each other in an arbitration area.

FIG. 20 is a sequence diagram showing an example of arbitration control performed by server device 100 when a plurality of drive routes do not intersect with each other in an arbitration area. FIG. 20 shows operations performed by two automatic vehicles 200 and server device 100 when two automatic vehicles 200 are in a state shown in FIG. 19A.

The following description will be given with reference to mainly FIG. 20 among FIGS. 2, 3, 19A, and FIG. 20. Automatic vehicles 201 and 202 each transmit a state notification indicating the state of the vehicle periodically (for example, every second) to server device 100 while they are in operation. Also, when automatic vehicles 201 and 202 perform an operation under control of the server device, automatic vehicles 201 and 202 report the result of the operation.

Controller 120 of server device 100 updates vehicle state information 134 stored in storage 130 shown in FIG. 9 by using the state notifications received from automatic vehicles 201 and 202 (step S2001).

When automatic vehicle 201 arrives at path point A1, automatic vehicle 201 temporarily stops, and transmits an arbitration request to server device 100 (step S2002).

Likewise, when automatic vehicle 202 arrives at path point B1, automatic vehicle 202 temporarily stops, and transmits an arbitration request (step S2002). Traffic controller 122 of server device 100 receives the arbitration requests from automatic vehicles 201 and 202, and determines whether the drive routes of automatic vehicles 201 and 202 intersect with each other in arbitration area M2.

Traffic controller 122 determines that drive route RB1 of automatic vehicle 201 and drive route RB2 of automatic vehicle 202 do not intersect with each other, and then transmits, to automatic vehicles 201 and 202, vehicle control information indicating an instruction, to cancel the temporary stop state (step S2004). Automatic vehicles 201 and 202 cancel the temporary stop state according to the temporary stop state cancellation control.

Automatic vehicles 201 and 202 each transmit an arbitration cancellation request to server device 100, and start driving (step S2005, and step 2006).

[1-2-5. Operation of Server Device 100 Performed when Plurality of Drive Routes Intersect in Arbitration Area]

A description will be given of arbitration control of server device 100 performed when a plurality of drive routes intersect with each other in an arbitration area. In the following description, it is assumed that there are three automatic vehicles 200: automatic vehicles 201, 202, and 203. Here, only operations performed by server device 100 and automatic, vehicles 201, 202, and 203 will be described.

Figure 21:
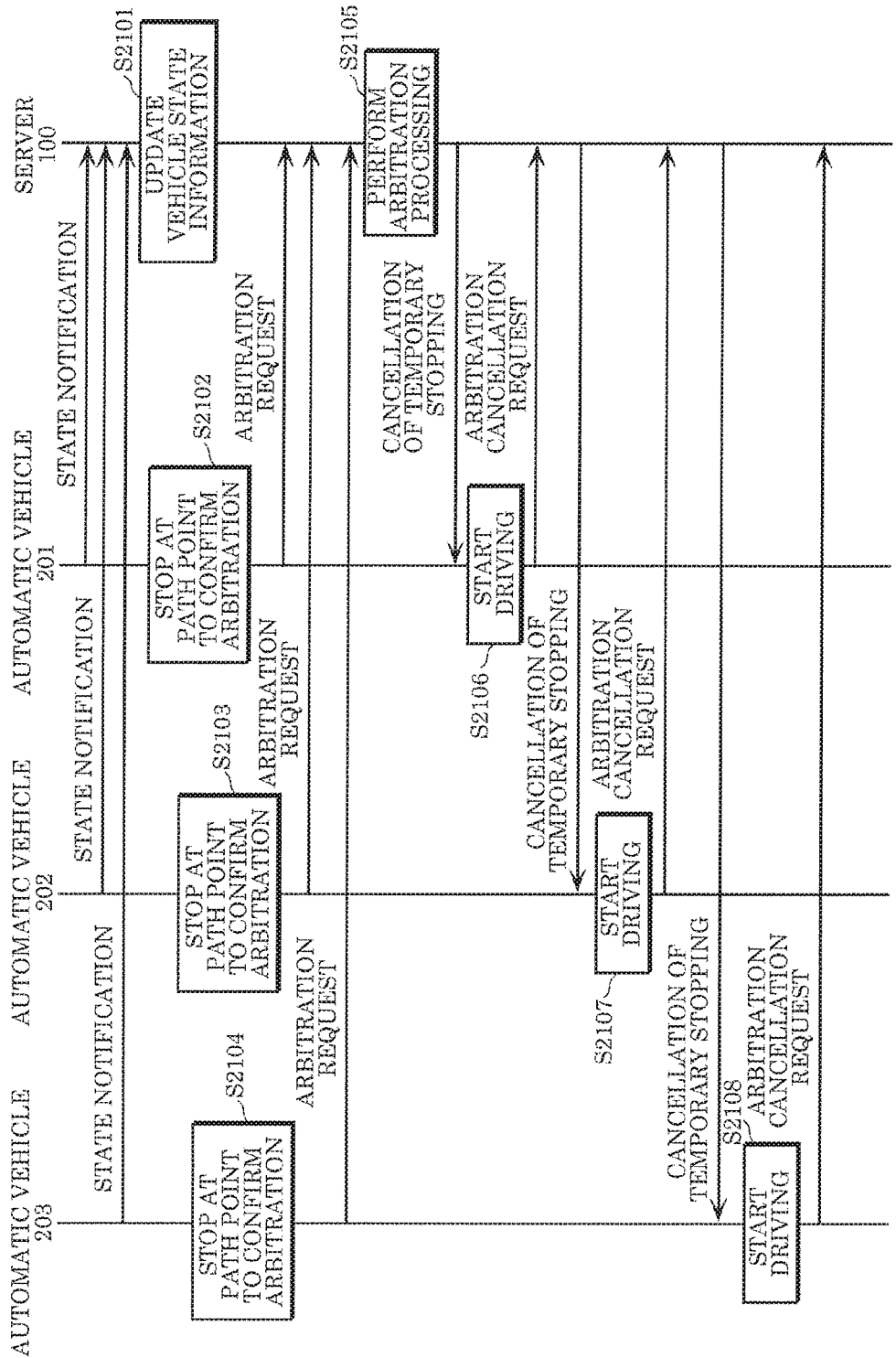
FIG. 21 is a sequence diagram showing an example of arbitration control performed by the server device when a plurality of drive routes intersect with each other in an arbitration area.

FIG. 21 is a sequence diagram showing an example of operations performed when a plurality of drive routes intersect with each other in an arbitration area. FIG. 21 is a sequence diagram showing an example of operations performed by each of three automatic vehicles 201, 202, and 203 and server device 100 when three automatic vehicles 201, 202, and 203 are about to enter an arbitration area at the same timing. FIGS. 22A to 22D are diagrams showing the positions of automatic vehicles 201, 202, and 203 at the intersection shown in FIG. 19B, the diagram showing a state according to a flow of arbitration control performed by server device 100.

The following description will be given with reference to mainly FIG. 21 among FIGS. 2, 3, 19B, 21, and 22A to 22D. Automatic vehicles 201, 202, and 203 each transmit state notification information periodically (for example, every second) to server device 100 while they are in operation.

Automatic vehicles 201 to 203 each transmit a state notification periodically (for example, every second) to server device 100 while they are in operation.

Upon receiving the state notifications, controller 220 of server device 100 updates vehicle state information 134 stored in storage 130 by using the received state notifications (step S2101).

When automatic vehicle 201 arrives at path point A1 that is a confirmation point, drive controller 221 of automatic vehicle 201 causes automatic vehicle 201 to temporarily stop, and transmits a state notification to server device 100.

Also, automatic vehicle 201 transmits an arbitration request to server device 100 (step S2102).

Next, when automatic vehicle 202 arrives at path point B1 that is a confirmation point, drive controller 221 of automatic vehicle 202 causes automatic vehicle 202 to temporarily stop, and transmits a state notification to server device 100.

Also, drive controller 221 of automatic vehicle 202 transmits an arbitration request to server device 100 (step S2103).

Next, when automatic vehicle 203 arrives at path point C1 that is a confirmation point, drive controller 221 of automatic vehicle 203 causes automatic vehicle 203 to temporarily stop, and transmits a state notification to server device 100.

Figure 22A:
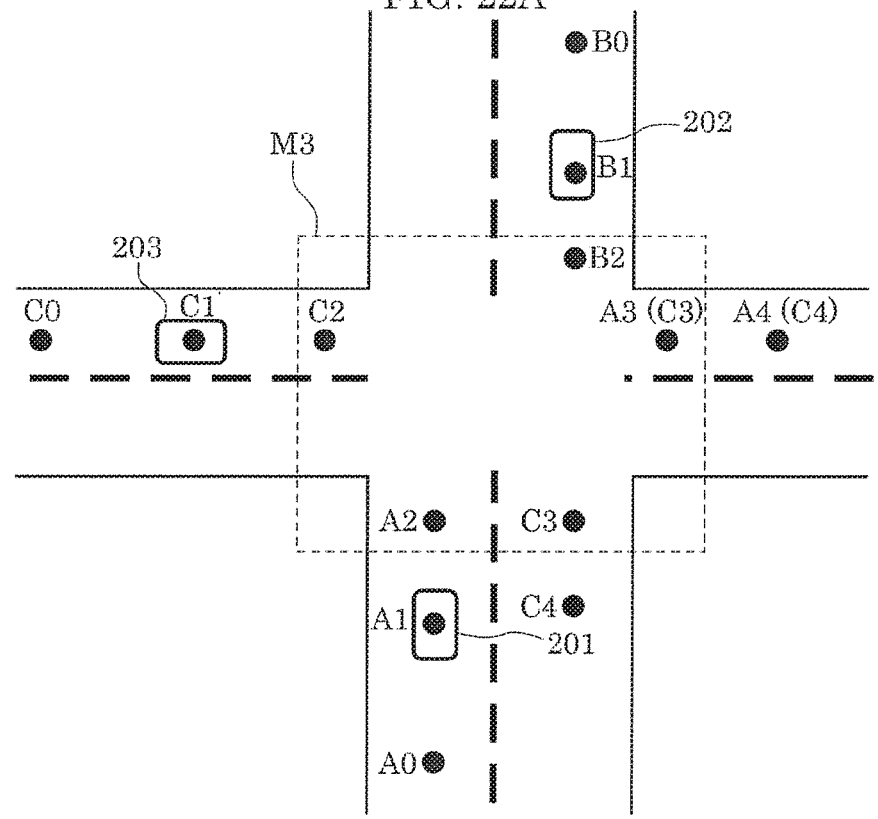
FIG. 22A is a diagram showing the positions of three automatic vehicles in FIG. 19B, the diagram showing a state according to a flow of arbitration control performed by the server device.

Also, drive controller 221 of automatic vehicle 203 transmits an arbitration request to server device 100 (step S2104). FIG. 22A shows a state in which automatic vehicles 201, 202, and 203 are stopping at their confirmation points.

Controller 120 of server device 100 causes traffic controller 122 to perform arbitration processing (step S2105). In this case, traffic controller 122 determines the driving order of automatic vehicles 201, 202, and 203 based on the order of reception of arbitration requests as follows: automatic vehicle 201, automatic vehicle 202, and automatic vehicle 203.

Figure 22B:
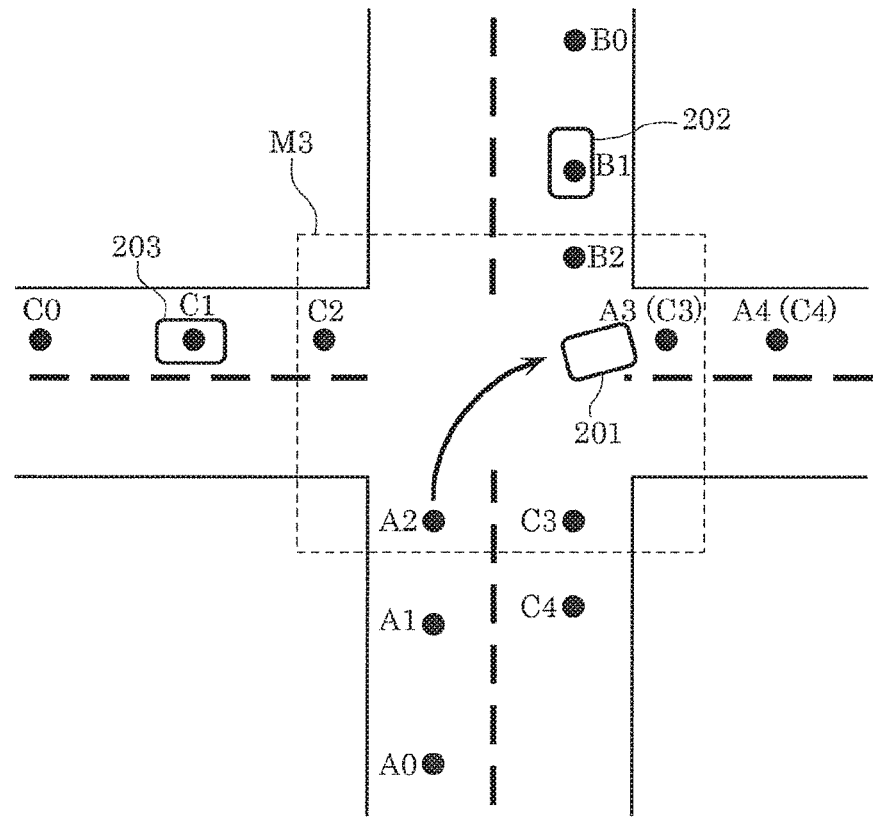
FIG. 22B is a diagram showing the positions of three automatic vehicles in FIG. 19B, the diagram showing a state according to the flow of arbitration control performed by the server device.

Traffic controller 122 of server device 100 transmits, to automatic vehicle 201, vehicle control information indicating an instruction to cancel the temporary stop state. Drive controller 221 of automatic vehicle 201 causes automatic vehicle 201 to start driving upon receiving the vehicle control information indicating an instruction to cancel the temporary stop state, and transmits an arbitration cancellation request to server device 100 (step S2106). FIG. 22B shows a state n which automatic vehicle 201 has started driving.

Figure 22C:
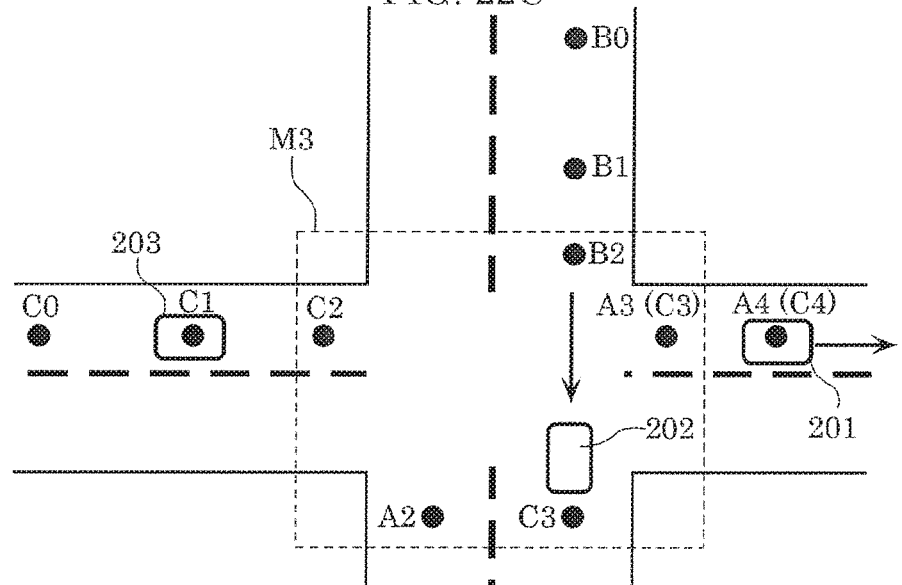
FIG. 22C is a diagram showing the positions of three automatic vehicles in FIG. 19B, the diagram showing a state according to the flow of arbitration control performed by the server device.

After automatic vehicle 201 has passed through the intersection, traffic controller 122 of server device 100 transmits, to automatic vehicle 202, vehicle control information indicating an instruction to cancel the temporary stop state. Drive controller 221 of automatic vehicle 202 causes automatic vehicle 202 to start driving upon receiving the vehicle control information indicating an instruction to cancel the temporary stop state, and transmits an arbitration cancellation request to server device 100 (step S2107). FIG. 22C shows a state in which automatic vehicle 202 has started driving.

Figure 22D:
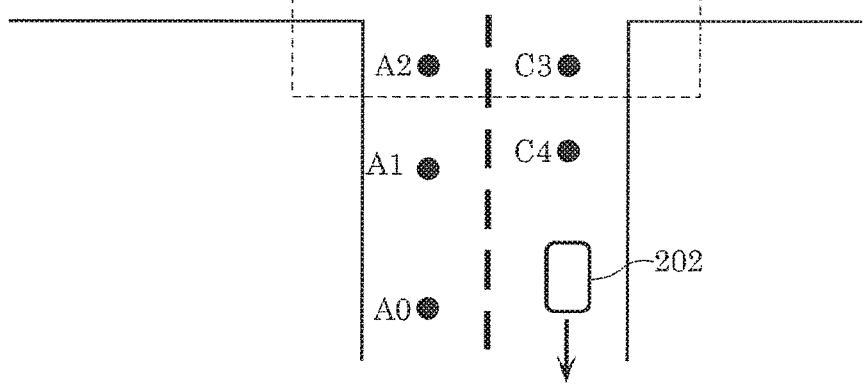
FIG. 22D is a diagram showing the positions of three automatic vehicles in FIG. 19B, the diagram showing a state according to the flow of arbitration control performed by the server device.

After automatic vehicle 202 has passed through the intersection, traffic controller 122 of server device 100 transmits, to automatic vehicle 203, vehicle control information indicating an instruction to cancel the temporary stop state. Drive controller 221 of automatic vehicle 203 causes automatic vehicle 203 to start driving upon receiving the vehicle control information indicating an instruction to cancel the temporary stop state, and transmits an arbitration cancellation request to server device 100 (step S2108). FIG. 22D shows a state in which automatic vehicle 203 has started driving.

Server device 100 ends the series of control operations for avoiding an interference between automatic vehicles 201, 202, and 203.

The foregoing described the case where there is a possibility of the occurrence of an interference between three automatic vehicles 201, 202, and 203 during driving, but the present disclosure also applicable to the case where there is a possibility of the occurrence of an interference between four or more automatic vehicles 200 during driving. In this case, server device 100 performs control operations as described above with respect to four or more automatic vehicles 200.

Also, in FIG. 21, each automatic vehicle 200 transmits an arbitration cancellation request to server device 100 after automatic vehicle 200 has started driving. However, as in FIG. 20, automatic vehicle 200 may start driving after having transmitted an arbitration cancellation request. Alternatively, in FIG. 20, automatic vehicle 200 may transmit an arbitration cancellation request to server device 100 after automatic vehicle 200 has started driving.

[1-2-6. Operation of Server Device 100 Performed when there is Obstacle on Drive Route]

Figure 23:
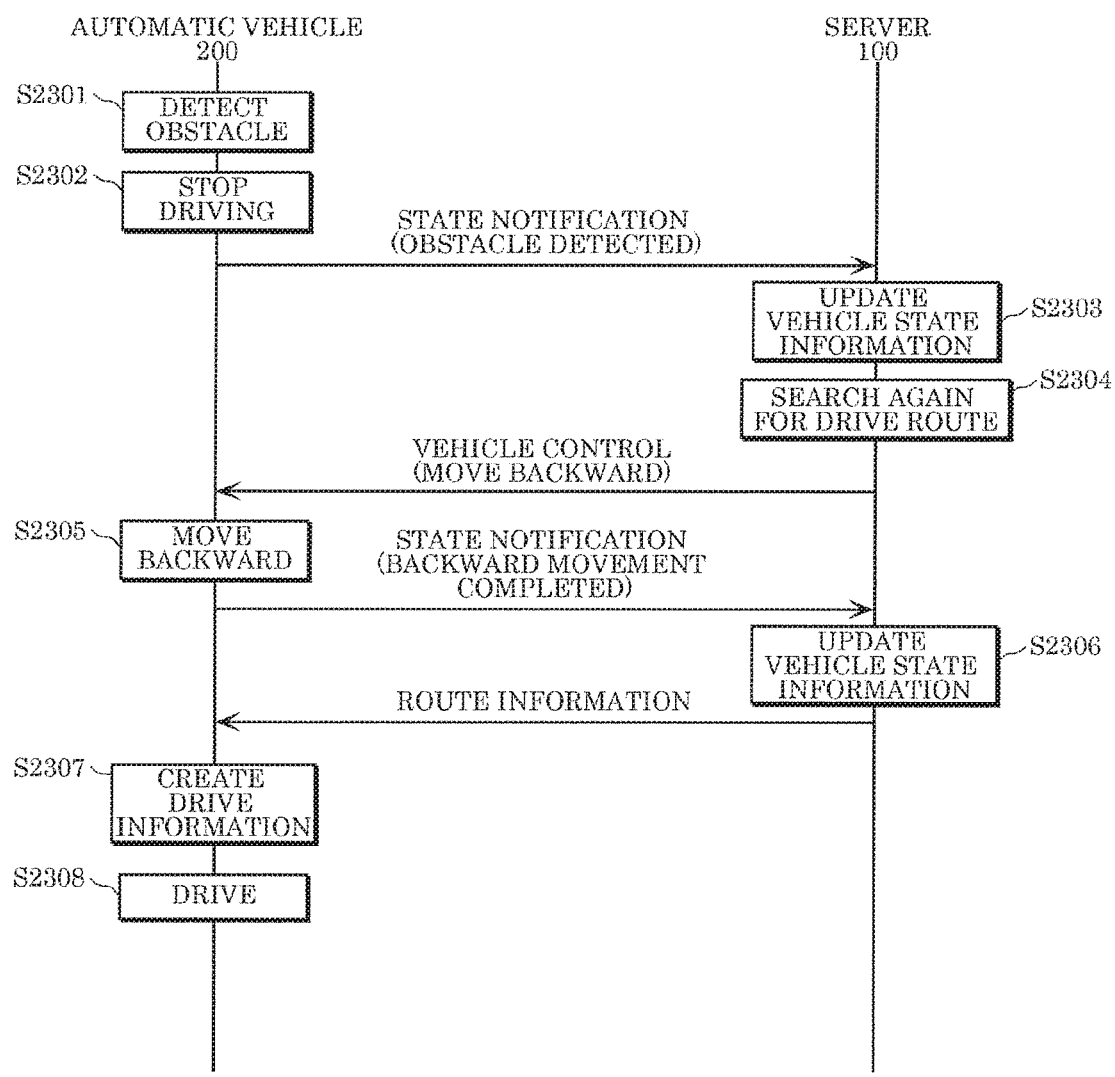
FIG. 23 is a sequence diagram showing an example of control performed by the server device when there is an obstacle on a drive route.
Figure 24:
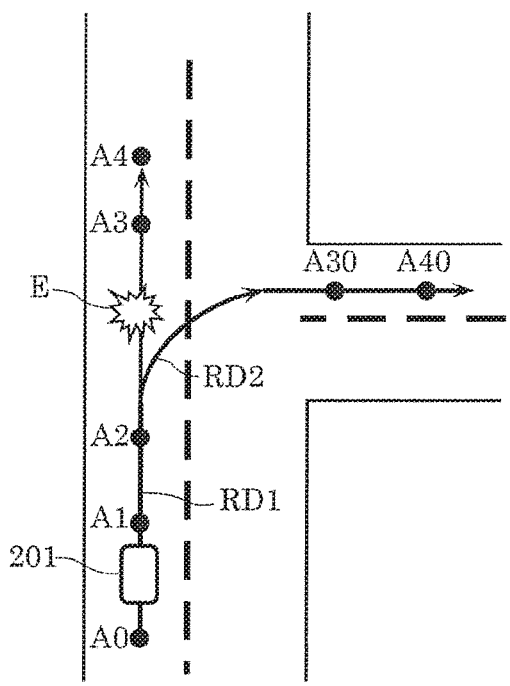
FIG. 24 is a diagram showing an example of operations when there is an obstacle.

FIG. 23 is a sequence diagram showing an example of operations performed by server device 100 when there is an obstacle on the drive route. FIG. 24 is a diagram showing an example of operations performed when there is an obstacle.

The following description will be given with reference to mainly FIG. 23 among FIGS. 2, 3, 23 and 24. Automatic vehicle 200 transmits state notification information periodically (for example, every second) to server device 100 while automatic vehicle 200 is in operation.

It is assumed automatic vehicle 200 drives along drive route RD1 including path points A0, A1, A2, A3, and A4 in this order, and obstacle detector 260 of automatic vehicle 200 detects obstacle E on drive route RD1 while the automatic vehicle is heading to path point A3 after having passed through path point A2 (step S2301).

Controller 220 of automatic vehicle 200 receives the notification from obstacle detector 230, and causes drive controller 221 to stop automatic vehicle 200 (step S2302). Controller 220 of automatic vehicle 200 transmits, to server device 100, obstacle information indicating that obstacle E has been detected between path points A2 and A3.

Upon receiving obstacle detection information from automatic vehicle 200, controller 120 of server device 100 updates the vehicle state information (step S2303).

Controller 120 of server device 100 causes route searcher 121 to search again for a route starting from path point A2 (step S2304).

Route searcher 121 searches again for a drive route from path point A2 to the destination (step S2304). In this case, route searcher 121 retrieves drive route RD2 including path points A2, A30, and A40. The path points after path point A40 are omitted. That is, in this case, route searcher 121 generates, as a second drive route for avoiding the position of the object, second route information that includes a plurality of path points that constitute drive route RD2 by at least partially changing the plurality of path points of the first route information based on the obstacle information.

Controller 120 of server device 100 causes traffic controller 122 to transmit vehicle control information containing an instruction to move automatic vehicle 200 backward to path point A2.

Drive controller 221 of automatic vehicle 200 performs backward movement to path point A2 that was the designated path point, and transmits a report indicating the completion of backward movement to server device 100 (step S2305).

Upon receiving the report indicating the completion of backward movement from automatic vehicle 200, controller 120 of server device 100 updates the vehicle state information (step S2306).

Controller 120 of server device 100 transmits, to automatic vehicle 200, second route information generated as a result of route searcher 121 performing a search again.

Drive controller 221 of automatic vehicle 200 creates drive information from the received second route information (step S2307).

Drive controller 221 causes automatic vehicle 200 to start driving according to the generated route information (step S2308). In this case, the automatic vehicle advances from path point A2 to path point A30 so as to drive along new drive route RD2.

[1-3. Advantageous Effects, Etc.]

As described above, automatic vehicle dispatching system 1 according to the present embodiment includes a plurality of automatic vehicles 200 and server device 100 that performs communication with the plurality of automatic vehicles 200.

Server device 100 includes communicator 110, storage 130, and route searcher 121. Communicator 110 performs communication with the plurality of automatic vehicles 200. Storage 130 stores area information 131 and vehicle information 133. Area information 131 includes a plurality of path points. The plurality of path points indicate a drive route for the plurality of automatic vehicles 200 in a predetermined area. Also, each of the plurality of path points includes driving attributes that indicate the movement state of automatic vehicle 200 on the drive route. Vehicle information 133 indicates the a vehicle attribute of each of the plurality of automatic vehicles 200 Route searcher 121 generates first route information for each of the plurality of automatic vehicles 200, the first route information including a plurality of path points selected from among the plurality of path points of area information 131 according to vehicle information 133 that corresponds to automatic vehicle 200 and indicating a first drive route for automatic vehicle 200 to drive.

Each of the plurality of automatic vehicles 200 includes communicator 210 and drive controller 221. Communicator 210 acquires the first route information generated by route searcher 121 for automatic vehicle 200 by performing wireless communication with server device 100. Drive controller 221 controls its automatic vehicle to drive based on the first route information acquired by communicator 210. The driving attributes include the position of the path point, the vehicle speed when passing through the path point, the angle of entrance for a vehicle to enter, and the direction of travel of the vehicle. The vehicle attribute includes, for each of the plurality of automatic vehicles 200, the vehicle length, the vehicle width, and the weight of the automatic vehicle.

Also, route searcher 121 performs at least one of the following operations according to vehicle information 133: (i) further adding additional path points to the first route information; and (ii) changing the parameters of the driving attributes the plurality of path points selected.

With this configuration, server device 100 can provide, to each of the plurality of automatic vehicles 200, first route information suitable for the vehicle by using area information 131 and vehicle information 133, and each vehicle can easily perform drive control suitable for the vehicle.

Accordingly, server device 100 can perform centralized control that is suitable for each of the plurality of automatic vehicles 200.

Also, the path points include the angle of entrance and the direction of travel, and it is therefore possible to perform not only drive control for driving along a linear or curved road, but also drive control for driving a V-shaped road, a switchback road, and the like.

In automatic vehicle dispatching system 1 according to the present embodiment, each of the plurality of automatic vehicles 200 further includes storage 230. Storage 230 stores vehicle information 232 of automatic vehicle 200. Drive controller 221 adds additional path points to a second drive route indicated by the plurality of path points of the first route information according to vehicle information 232 stored in storage 230, and controls its automatic vehicle to drive based on drive information obtained as a result of addition of the additional path points.

With this configuration, automatic vehicle 200 can perform drive control suitable for automatic vehicle 200 by using route information 132 and vehicle information 232 that were received.

In automatic vehicle dispatching system 1 according to the present embodiment, communicator 110 acquires, from the plurality of automatic vehicles 200, vehicle state information regarding the state of the plurality of automatic vehicles 200 including the position of the plurality of automatic vehicles 200. Storage 130 stores vehicle state information 134 acquired by communicator 110, and also stores the first route information of each of the plurality of automatic vehicles 200 generated by route searcher 121 as route information 132. Each of the plurality of path points further includes an arbitration attribute that at least indicates that the path point is a path point prior to an arbitration area that is a segment that is on the first drive route and in which there is a possibility of the occurrence of an interference between the plurality of automatic vehicles 200 during driving. If it is determined that the arbitration attribute of one of the plurality of path points of the first route information indicates that the path point is path point prior to the arbitration area, drive controller 221 causes its automatic vehicle to stop, and transmits an arbitration request to server device 100. The server device further includes traffic controller 122. Upon receiving the arbitration request, traffic controller 122 determines, based on vehicle state information 134 and route information 132, whether or not there is a possibility of occurrence of an interference between the plurality of automatic vehicles 200 during driving. If it is determined that there is the possibility of occurrence of the interference between the plurality of automatic vehicles 200 during driving, traffic controller 122 controls the timing of entering the arbitration area for the automatic vehicle that has the possibility of occurrence of the interference. If it is determined that there is no possibility of occurrence of the interference between the plurality of automatic vehicles 200 during driving, traffic controller 122 permits the automatic vehicle that transmitted the arbitration request to enter the arbitration area.

Accordingly, server device 100 can perform driving control based on a result of determination made by determining whether or not there is a possibility of occurrence of an interference between the plurality of automatic vehicles 200 during driving by using route information 132 and vehicle state information 134.

With this configuration, it is possible to flexibly cope with a case where there is a possibility of the occurrence of an unexpected interference between the auto automatic vehicles during driving.

In automatic vehicle dispatching system 1 according to the present embodiment, each of the plurality of automatic vehicles 200 includes external sensor 240 and obstacle detector 260. External sensor 240 detects the presence or absence of an object around automatic vehicle 200. Obstacle detector 260 generates, based on the result of detection performed by external sensor 240, obstacle information regarding the presence or absence of an object around automatic vehicle 200 and the position of the object. If obstacle detector 260 detects that there is an object on the first drive route, drive controller 221 causes its automatic vehicle to stop, and transmits obstacle information to server device 100. Route searcher 121 generates second route information that includes a plurality of path points that constitute a second drive route that avoids the object by at least partially changing the plurality of path points of the first route information based on the obstacle information. Drive controller 221 causes its automatic vehicle to start driving based on the second route information.

With this configuration, even if there is an object on the drive route of automatic vehicle 200, it is possible to cause automatic vehicle 200 to drive along a drive route that avoids the object. Accordingly, it is also possible to flexibly cope with a case where there is a possibility of the occurrence of an interference between the automatic vehicle and an unexpected object.

In automatic vehicle dispatching system 1 according to the present embodiment, each of the plurality of automatic vehicles 200 further includes input receiver 270. Input receiver 270 receives an input of a destination of automatic vehicle 200. Communicator 210 transmits the destination indicated by the input received by input receiver 270 to server device 100. Route searcher 121 generates the first route information from the plurality of path points based on the destination received from automatic vehicle 200.

With this configuration, it is possible to cause the automatic vehicle to drive along a drive route according to the input destination.

Embodiment 2

Hereinafter, automatic vehicle dispatching system 2 according to Embodiment 2 will be described with reference to the drawings.

[2-1. Configuration of Automatic Vehicle Dispatching System 2]

[2-1-1. Overall Configuration of Automatic Vehicle Dispatching System 2]

Figure 25:
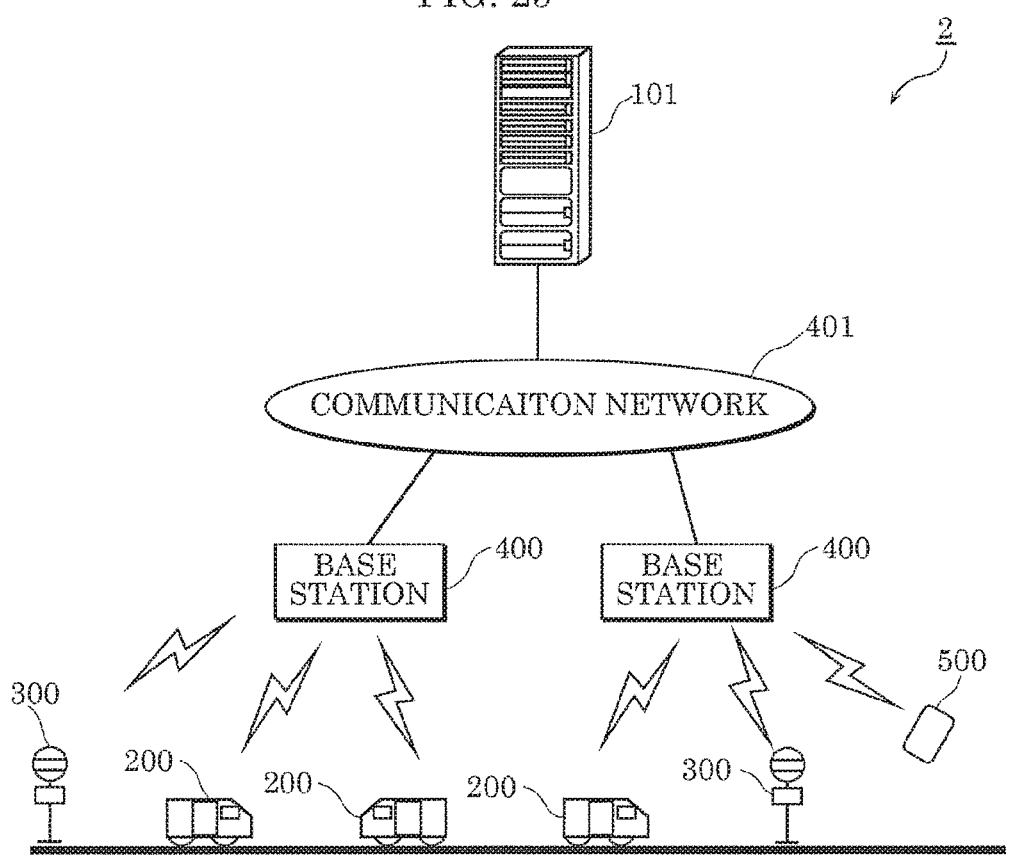
FIG. 25 is a schematic diagram schematically showing an automatic vehicle dispatching system according to Embodiment 2.

FIG. 25 is a schematic diagram schematically showing automatic vehicle dispatching system 2 according to Embodiment 2.

Referring to FIG. 25, automatic vehicle dispatching system 2 includes server device 101, a plurality of automatic vehicles 200, at least one base station 400, a plurality of stations 300, and wireless terminal 500. Server device 101 and base station 400 are connected to communication network 401.

In FIG. 25, the configuration of server device 101 is the same as that of server device 100 according to Embodiment 1, and thus a description thereof is omitted here. Likewise, automatic vehicles 200, base station 400 and communication network 401 also have the same configuration and perform the same operations as those of Embodiment 1, and thus a description thereof is omitted here.

Stations 300 are installed at predetermined path points and are places where users board and unboard automatic vehicle 200. If automatic vehicle 200 is not at station 300, a user can make a vehicle dispatch request from station 300 to server device 101. Station 300 performs communication with server device 101 via base station 400 so as to transmit a request for dispatching automatic vehicle 200 to server device 101. As station 300, a power charging spot may be set where automatic vehicle 200 performs charging. The power charging spot may be installed at a path point in which station 300 is not provided.

Wireless terminal 500 is a mobile terminal that can be carried by a user who uses automatic vehicle 200 and is capable of performing communication with server device 101 and the like. The user may transmit a vehicle dispatch request for dispatching automatic vehicle 200 to server device 101 via base station 400 by using wireless terminal 500. Wireless terminal 500 is, for example, a mobile phone, and may be a mobile terminal such as a smart phone, a smart watch, a tablet, or a small-sized personal computer.

A wireless LAN (Local Area Network) such as Wi-Fi® (Wireless Fidelity) may be used for the wireless communication between station 300 and base station 400 and between wireless terminal 500 and base station 400. It is also possible to use other wireless communication methods.

[2-1-2. Configuration of Station 300]

A configuration of station 300 according to the present embodiment will be described.

Figure 26:
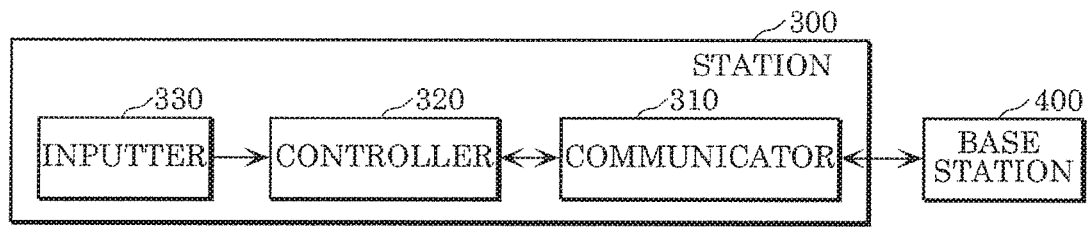
FIG. 26 is a block diagram schematically showing a configuration of a station shown in FIG. 25.

FIG. 26 is a block diagram schematically showing a configuration of station 300 shown in FIG. 25.

Referring to FIG. 26, station 300 includes communicator 310, controller 320, and inputter 330.

Communicator 310 is a structural element that performs communication with server device 101, and the like. Communicator 310 may be a communication instrument, a processing circuit including a communication interface, or the like. Communicator 310 performs communication with server device 100, and the like via base station 400 under control of controller 320. To be specific, communicator 310 establishes a connection with base station 400 through wireless communication, and performs communication with server device 101 via communication network 401. Communicator 310 may be configured to transmit the received information to either of controller 320 and the storage (not shown), and may be configured to receive information from either of controller 320 and the storage, and transmit the received information.

Controller 320 may be implemented in any way as long as a control function of controlling station 300 as a whole is included. For example, controller 320 may be implemented by dedicated hardware. Also, for example, controller 320 may be implemented by executing a software program suitable for each structural element. In this case, controller 320 may include, for example, a processor (not shown) and a storage (not shown) that stores a control program. As the processor, a MPU (Micro Processing Unit), a CPU (Central Processing Unit), or the like may be used, for example. The storage may be a memory, for example. Controller 320 may be implemented by a single controller that performs centralized control, or may be implemented by a plurality or controllers that perform distributed control by working in cooperation with each other.

Inputter 330 is a structural element for a user to input an instruction to dispatch automatic vehicle 200. The inputter includes, for example, a touch panel, and the like.

[2-2. Operation of Automatic Vehicle Dispatching System 2]

Figure 27:
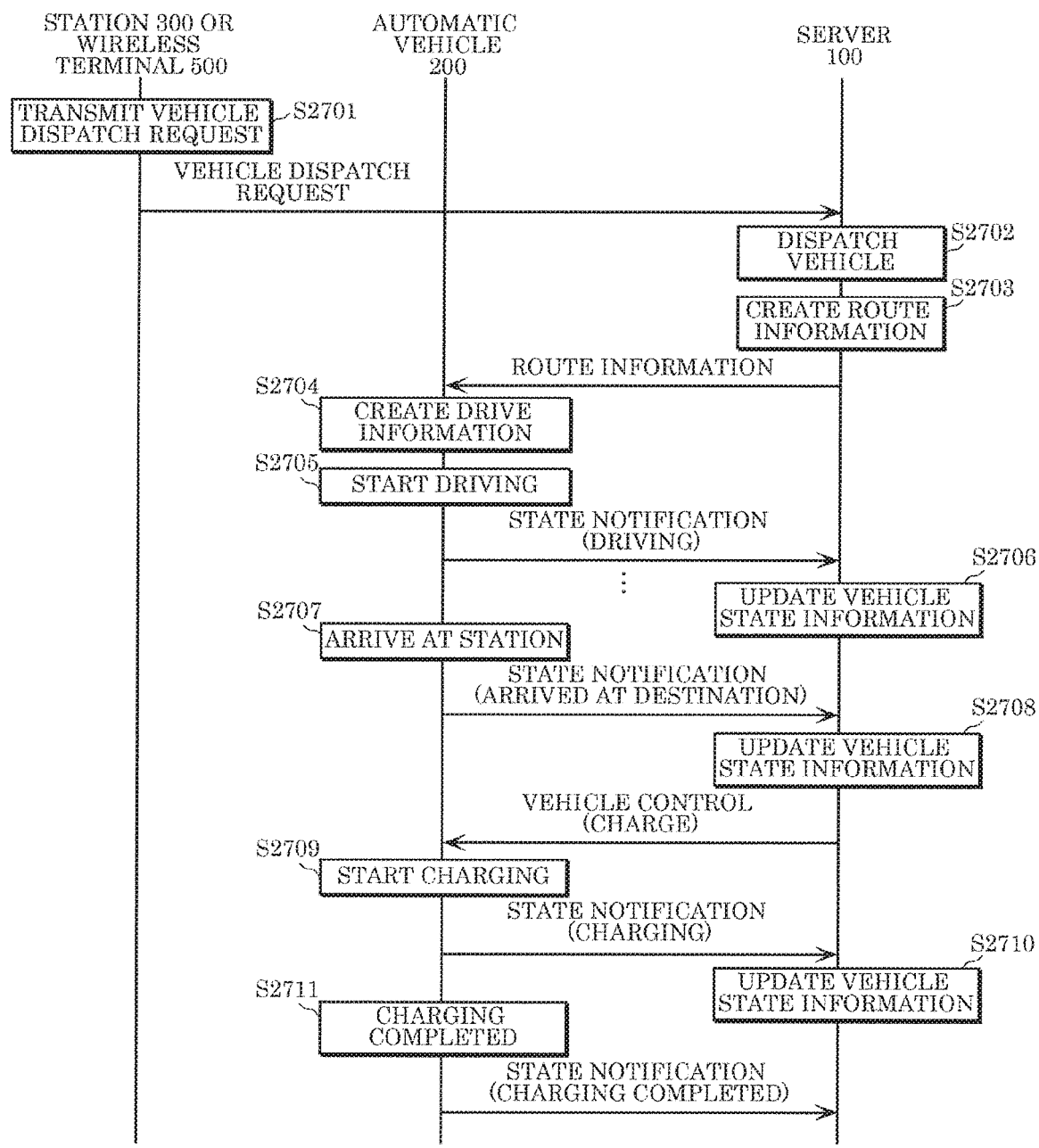
FIG. 27 is a sequence diagram showing operations performed when a vehicle dispatch request is received from a station or a wireless terminal.

FIG. 27 is a sequence diagram showing operations performed when a vehicle dispatch request is received from station 300 or wireless terminal 500.

If station 300 or wireless terminal 500 receives an input of a vehicle dispatch request from a user, station 300 or wireless terminal 500 transmits the vehicle dispatch request to server device 101 (step S2701).

In the case where a vehicle dispatch request is input from station 300, the user makes the vehicle dispatch request by using inputter 330.

Upon receiving the vehicle dispatch request from inputter 330, controller 320 transmits the vehicle dispatch request to server device 101 via communicator 310. In the case where a vehicle dispatch request is input from wireless terminal 500, the user also transmits information regarding station 300 where the user wants to have a vehicle dispatched.

Upon receiving the vehicle dispatch request, controller 120 of server device 101 selects one from among automatic vehicles 200 whose vehicle state in vehicle state information 134 is "standby" and updates the vehicle state of selected automatic vehicle 200 with "set for dispatch" (step S2702).

Controller 120 sets the current position of automatic vehicle 200 as the start location, and also sets the path point at which station 300 is set or the path point of station 300 designated by wireless terminal 500 as the destination, and then causes route searcher 121 to perform a route search and create route information (step S2703).

Controller 120 of server device 101 transmits the route information created by route searcher 121 to automatic vehicle 200.

Upon receiving the route information from server device 101, controller 220 of automatic vehicle 200 causes drive controller 221 to create drive information. Drive controller 221 creates drive information (step S2704), and causes the vehicle to start driving based on the created drive information (step S2705).

Controller 120 of automatic vehicle 200 periodically transmits a state notification, and server device 101 updates vehicle state information 134 as necessary (step S2706).

Upon arriving at station 300 that is the destination, automatic vehicle 200 stops and transmits a notification to server device 101 (step S2707).

Server device 101 updates the vehicle state of automatic vehicle 200 with "dispatched" (step S2708).

Here, it is assumed that there is time before the scheduled boarding time of the user, and thus server device 101 controls automatic vehicle 200 to charge. Automatic vehicle 200 starts charging power into battery device 280 at the power charging spot installed at the station (step S2709).

Upon completion of charging, automatic vehicle 200 transmits a report to server device 101 (step S2711). In this case, automatic vehicle 200 may terminate the charging upon detection of the arrival of the user.

[2-3. Advantageous Effects]

As described above, automatic vehicle dispatching system 2 according to the present embodiment includes station 300 that is capable of performing communication with server device 101 and transmitting a request for dispatching automatic vehicle 200 to server device 101. Also, automatic vehicle dispatching system 2 according to the present embodiment includes wireless terminal 500 that is capable of performing communication with server device 101 and transmitting a request for dispatching automatic vehicle 200 to server device 101.

With this configuration, various types of dispatch settings can be made in server device 101 by using station 300 or wireless terminal 500.

Also, server device 101 according to the present embodiment is a server that includes at least part of the configuration described above. With this configuration, server device 101 produces the same advantageous effects as those described above.

Generic or specific aspects of the above-described configuration may be implemented by an apparatus, a method, an integrated circuit, a computer program, or a non-transitory recording medium such as a computer-readable CD-ROM, or may be implemented by any combination of, an apparatus, a method, an integrated circuit, a computer program, and a recording medium.

Other Embodiments

The embodiments described, above are given merely to illustrate examples of the technique according to the present disclosure of the present application. However, the technique according to the present disclosure is not limited thereto, and is also applicable to embodiments obtained by making modifications, replacements, additions, omissions and the like as appropriate.

It is also possible to implement additional embodiments by combining the structural elements of the embodiments described above and embodiments which will be described below.

Hereinafter, other embodiments will be described.

(A)

Although not mentioned in the embodiments described above, the vehicle information may further include vehicle type as a vehicle attribute.

FIG. 28 is a diagram showing an example of vehicle information according to Additional Embodiment (A).

Referring to FIG. 28, as the vehicle type, for example, "ordinary vehicle" and "emergency vehicle" may be used. The embodiments described above are configured such that, for example, traffic controller 122 of server device 101 that has received arbitration requests permits automatic vehicles 200 to enter the arbitration area in the order of arrival at the arbitration area. However, server device 101 may be configured such that upon receiving an arbitration request from an automatic vehicle whose vehicle type is emergency vehicle, traffic controller 122 determines the order of entrance into the arbitration area by giving a higher priority to the automatic vehicle whose vehicle type is emergency vehicle. In this way, by giving precedence and permitting the automatic vehicle whose vehicle type is emergency vehicle to enter the arbitration area over the automatic vehicles whose vehicle type is ordinary vehicle, it is possible to enable the emergency vehicle to quickly arrive at the destination.

Furthermore, each path point may include, as a driving attribute, a road attribute that identifies the type of drive route to which the path point belongs. The road attribute may indicate, for example, "major road" that indicates a road with heavy traffic, or "residential street" that indicates a street with a little traffic.

Figure 29A:
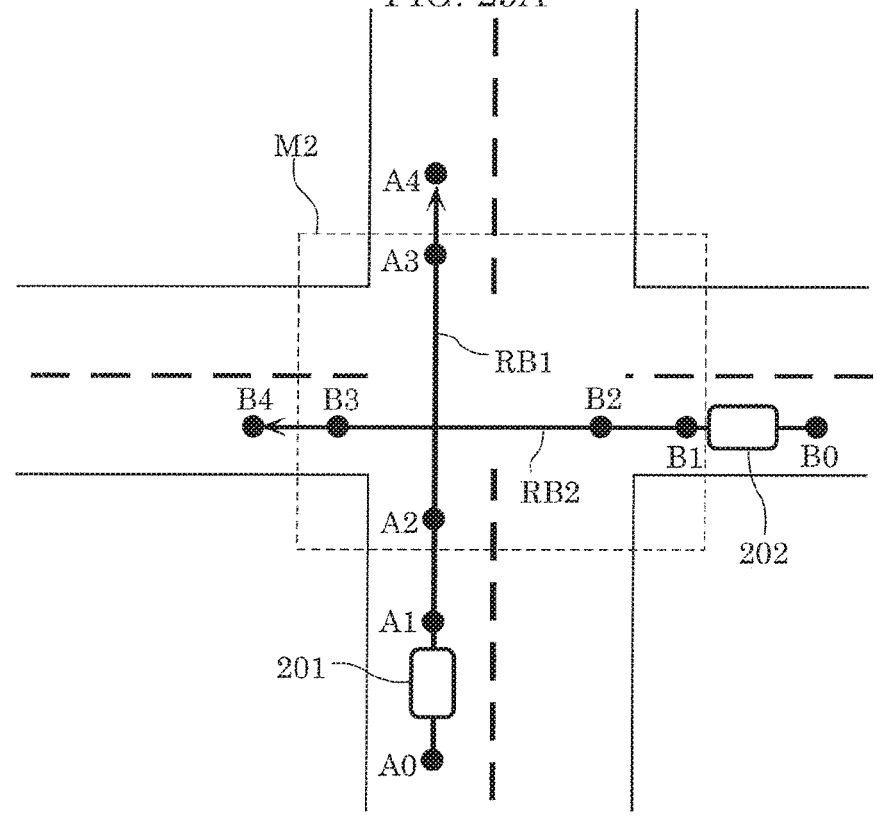
FIG. 29A is a diagram showing an example in which a major road and a residential street intersect with each other in an arbitration area.
Figure 29B:
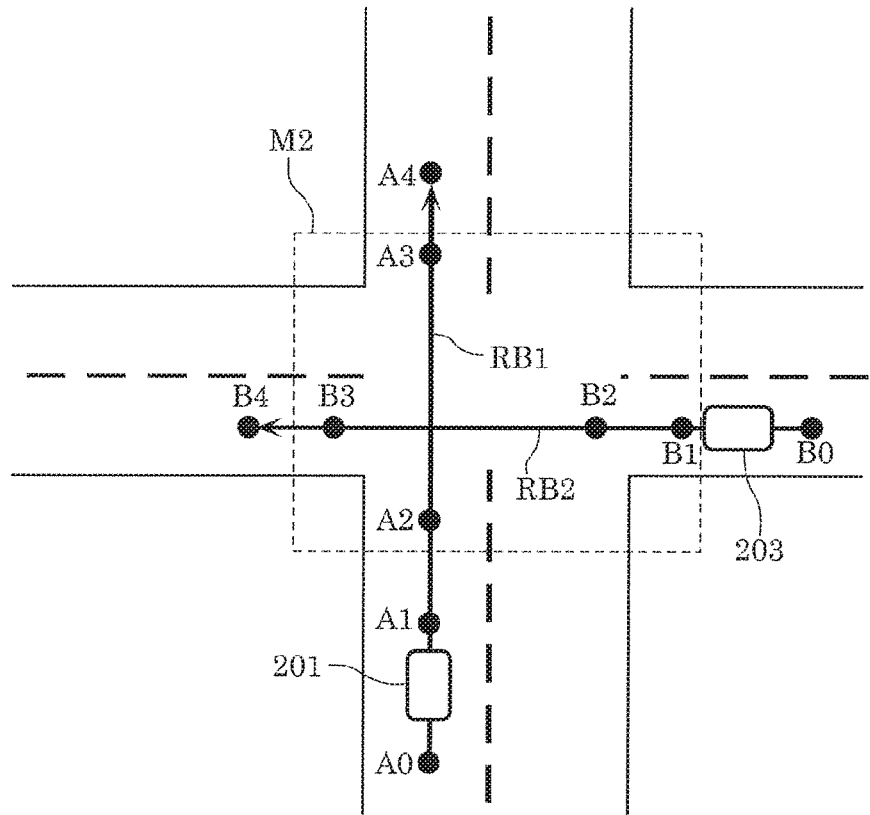
FIG. 29B is a diagram showing an example in which a major road and a residential street intersect with each other in an arbitration area.

FIGS. 29A and 29B are diagrams showing an intersection of a major road and a residential street in an arbitration area. FIGS. 29A and 29B show examples in which the road attributes of the driving attributes of a plurality of path points A0, A1, A2, A3, and A4 that constitute drive route RB1 indicate "major road", and the road attributes of a plurality of path points B0, B1, B2, B3, and B4 that constitute drive route RB2 indicate "residential street". FIG. 29A shows the case where the vehicle type of both of automatic vehicles 201 and 202 indicates "ordinary vehicle", FIG. 29B shows the case where the vehicle type of automatic vehicle 201 indicates "ordinary vehicle", and the vehicle type of automatic vehicle 203 indicates "emergency vehicle".

In the case of FIG. 29A, server device 101 may be configured to, upon receiving arbitration requests from automatic vehicles 201 and 202, check the road attributes of the drive routes of automatic vehicles 201 and 202, and determine the order of entrance into the arbitration area such that precedence is given to automatic vehicle 201 whose road attribute indicates "major road" over automatic vehicle 202 whose road attribute indicates "residential street". In this case, server device 101 also checks the vehicle type of automatic vehicles 201 and 202, hut the vehicle type of both of automatic vehicles 201 and 202 indicates "ordinary vehicle", and thus it does not affect the arbitration.

On the other hand, in the case of FIG. 29B, server device 101 may be configured to, upon receiving arbitration requests from automatic vehicles 201 and 203, check the road attributes of the drive routes of automatic vehicles 201 and 203, and also checks the vehicle type of automatic vehicles 201 and 203. Then, traffic controller 122 determines the order of entrance into the arbitration area such that precedence is given to automatic vehicle 203 whose road attribute of the drive route indicates "residential street" but vehicle type is "emergency vehicle" over automatic vehicle 201. That is, traffic controller 122 may determine the order of entrance into the arbitration area based on the difference in the vehicle type rather than the difference in the road attribute.

(B)

Although not mentioned in the embodiments described above, route searcher 121 may change the drive route of the automatic vehicle according to the magnitude of the vehicle width of the automatic vehicle in the case where the drive route is a drive route where a plurality of lanes are laid out in parallel in the same drive direction.

Figure 30A:
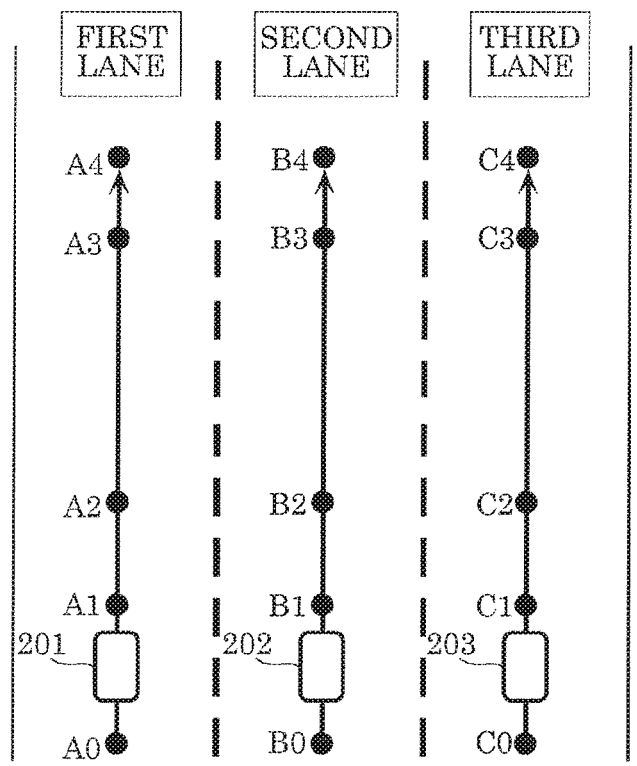
FIG. 30A is a diagram showing a drive route where a plurality of lanes are laid out in parallel in the same drive direction according to Additional Embodiment (B)
Figure 30B:
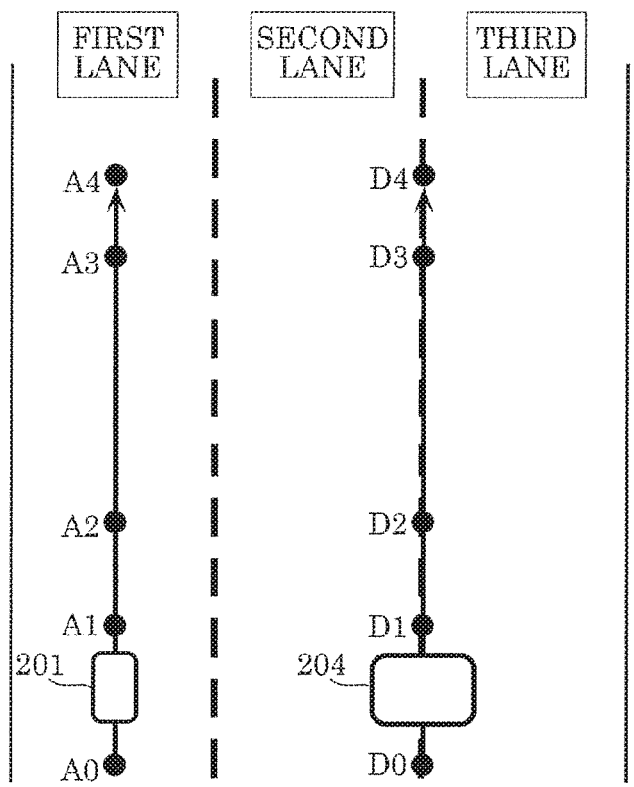
FIG. 30B is a diagram showing a drive route where a plurality of lanes are laid out in parallel in the same drive direction according to Additional Embodiment (B).

FIGS. 30A and 30B are diagrams each showing a drive route where a plurality of lanes are laid out in parallel in the same drive direction according to Additional Embodiment (B). FIG. 30A shows an example in which automatic vehicles 201 to 203 whose vehicle width is less than a specified width drive, and FIG. 30B shows an example in which automatic vehicle 204 whose vehicle width is greater than or equal to the specified width drives.

In FIG. 30A, in the case where, for example, automatic vehicles 201 to 203 drive along the same drive route at the same timing, because the drive route includes three lanes including first to third lanes, and three automatic vehicles 201 to 203 have a vehicle width smaller than a specified width, route searcher 121 determines the drive routes so as to respectively allocate the three lanes to three automatic vehicles 201 to 203.

In FIG. 30B, in the case where, for example, automatic vehicles 201 and 204 drive along the same drive route at the same timing, because the drive route includes three lanes including first to third lanes, automatic vehicle 201 has a vehicle width smaller than a specified width, and automatic vehicle 204 has a vehicle width greater than or equal to the specified width, route searcher 121 may determine the drive routes so as to allocate one lane (the first lane) to automatic vehicle 201, and allocate two lanes (the second lane and the third lane) to automatic vehicle 204.

That is, route searcher 121 may determine, based on the vehicle width of the vehicle information of an automatic vehicle, the width of the lane for the automatic vehicle to drive, and generate route information that includes a plurality of path points that constitute a drive route corresponding to the determined lane width. Route searcher 121 may determine the drive route such that an automatic vehicle having a larger vehicle width drives along a drive route having a wider lane width.

(C)

In the embodiments described above, an example was described in which the automatic vehicle drives toward the destination that was set before the vehicle started driving, but the destination may be changed by the user riding on the automatic vehicle while the user is in the vehicle. In this case, the automatic vehicle transmits a notification indicating that the destination has been changed to the server device, the server device causes the route searcher to create route information by changing the destination, and the automatic vehicle drives based on the route information created by the route searcher.

(D)

In the embodiments described above, an example was described in which the automatic vehicle carries a user to the destination, but the user may input an instruction to stop to the automatic vehicle so as to leave the vehicle before arriving at the destination. In this case, the automatic vehicle stops at the nearest path point located in the direction of travel for the user to onboard. Also, the automatic vehicle transmits, to the server device, a notification indicating that a stopover request has been made. Then, the server device updates the vehicle state information of the automatic vehicle.

(E)

In the embodiments described above, an example was described in which the user inputs a vehicle dispatch request by using the wireless terminal, but the user may designate the date and time when the user wants to have a vehicle dispatched, at the time of making a vehicle dispatch request.

(F)

In the present disclosure, the position is indicated by the combination of a latitude and a longitude, but may include a height above the sea level.

(G)

In the present disclosure, a configuration was described in which the automatic vehicle temporarily stops at the path point whose arbitration attribute indicates "confirm", but the automatic vehicle may transmit an arbitration request by, for example, driving slowly, without temporarily stopping.

(H)

In Embodiment 2, the vehicle dispatch request was made by the user using the station or the wireless terminal, but the configuration is not limited thereto. For example, a configuration is possible in which a human sensor or the like is installed in the station so as to detect that the user is in the station. With this configuration, the station can automatically make a vehicle dispatch request without requiring the user to perform an operation.

(I)

Also, in the present disclosure, automatic vehicle 200 is configured to create drive information by using the received route information and vehicle information, but may be configured to use the route information transmitted from server device 100 as the drive information, and drive based on the route information generated by server device 100. In this case, route searcher 121 of server device 100 may create route information similar to the drive information shown in FIGS. 11A and 11B created by drive controller 221 of automatic vehicle 200 according to the present disclosure.

In the foregoing, the embodiments have been described as examples of the technique according to the present disclosure. For this purpose, the accompanying drawings and detailed description have been provided.

Accordingly, the structural elements illustrated in the accompanying drawings and described in the detailed description include not only structural elements required to solve the problem, but also structural elements that are merely given to illustrate the above technique and thus are not required to solve the problem. For this reason, the structural elements that are not required to solve the problem should not be construed as requirements of the present disclosure just because of the fact that they are illustrated in the accompanying drawings and described in the detailed description.

Also, the embodiments described above are given merely to illustrate the technique according to the present disclosure, and thus various modifications, replacements, additions, omissions and the like can be made within the scope of the claims or the range of equivalency.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to an automatic vehicle dispatching system that controls a plurality of automatic vehicles, and a server device that controls a plurality of automatic vehicles.

What is claimed is:

1. An automatic vehicle dispatching system, comprising:
a plurality of automatic vehicles; and
a server device that performs communication with the plurality of automatic vehicles,
wherein the server device includes:
  a server interface that performs communication with the plurality of automatic vehicles;
  a server memory that stores: area information that includes a first plurality of path points in a predetermined area that indicate a drive route for the plurality of automatic vehicles, each of the first plurality of path points including driving attributes that represent an automatic vehicle movement state on the drive route; and vehicle information that indicates vehicle attributes of each of the plurality of automatic vehicles; and
  a server processor that generates, for each of the plurality of automatic vehicles, first route information that includes a second plurality of path points selected from among the first plurality of path points of the area information according to the vehicle information of a corresponding one of the plurality of automatic vehicles, the first route information indicating a first drive route,
each automatic vehicle of the plurality of automatic vehicles includes:
  a vehicle interface that acquires the first route information generated by the server processor for the automatic vehicle by performing wireless communication with the server device; and
  a drive controller that causes the automatic vehicle to drive based on the first route information acquired by the vehicle interface,
the driving attributes of each path point of the first plurality of path points include a position of the path point, a vehicle speed when passing through the path point, an angle of entrance for a vehicle to enter, and a vehicle travel direction,
the vehicle atttributes include, for each of the plurality of automatic vehicles, a vehicle length, a vehicle width, a weight, and a vehicle model of the automatic vehicle, and
the server processor is configured to: add additional path points to the first route information of a first one of the plurality of automatic vehicles according to the vehicle attributes of the first one of the plurality of automatic vehicles; and change parameters of the driving attributes of at least one of the second plurality of path points selected for a second one of the plurality of automatic vehicles according to the vehicle attributes of the second one of the plurality of automatic vehicles.

2. The automatic vehicle dispatching system according to claim 1,
wherein each automatic vehicle of the plurality of automatic vehicles further includes a vehicle memory in which the vehicle information of the automatic vehicle is stored, and
the drive controller of each automatic vehicle is configured to further add second additional path points to a second drive route indicated by the second plurality of path points of the first route information according to the vehicle information stored in the vehicle memory, and cause the automatic vehicle to drive based on drive information obtained as a result of addition of the second additional path points.

3. The automatic vehicle dispatching system according to claim 1,
wherein the server interface acquires vehicle state information from each of the plurality of automatic vehicles, the vehicle state information being information regarding a state of each of the plurality of automatic vehicles including a position of each of the plurality of automatic vehicles,
the server memory stores the vehicle state information acquired by the server interface, and also stores, as total route information, the first route information of each of the plurality of automatic vehicles generated by the server processor,
each path point of the first plurality of path points further includes an arbitration attribute that at least indicates that the path point is prior to an arbitration area that is a segment that is on the first drive route and in which there is a possibility of occurrence of an interference between the plurality of automatic vehicles during driving,
the drive controller of one automatic vehicle causes the one automatic vehicle to stop, and transmits an arbitration request to the server device when the arbitration attribute of one path point of the second plurality of path points of the first route information indicates that the one path point is prior to the arbitration area,
the server device further includes a traffic controller that, upon receiving the arbitration request, determines whether or not there is the possibility of occurrence of the interference between the plurality of automatic vehicles during the driving based on the vehicle state information and the total route information, and when there is the possibility of occurrence of the interference, controls a timing of entering the arbitration area for the one automatic vehicle that has the possibility of occurrence of the interference.

4. The automatic vehicle dispatching system according to claim 3,
wherein when there is no possibility of occurrence of the interference between the plurality of automatic vehicles during the driving, the traffic controller permits the one automatic vehicle that transmitted the arbitration request to enter the arbitration area.

5. The automatic vehicle dispatching system according to claim 1, further comprising:
a relay station that relays communication between the plurality of automatic vehicles and the server device,
wherein the relay station is connected to the plurality of automatic vehicles through wireless communication, and is connected to the server device via a communication network.

6. The automatic vehicle dispatching system according to claim 1,
wherein each automatic vehicle of the plurality of automatic vehicles includes:
an external sensor that detects a presence or absence of an object around the automatic vehicle,
each automatice vehicle generates, based on a result of detection by the external sensor, obstacle information regarding the presence or absence of the object around the automatic vehicle and a position of the object,
the drive controller causes the automatic vehicle to stop and transmits the obstacle information to the server device, when the presence of the object is detected on the first drive route,
the server processor generates second route information that includes a third plurality of path points that indicate a second drive route that avoids the position of the object by at least partially changing the second plurality of path points of the first route information based on the obstacle information, and
the drive controller causes the automatic vehicle to start driving based on the second route information.

7. The automatic vehicle dispatching system according to claim 1,
wherein each automatic vehicle of the plurality of automatic vehicles further includes an input that receives a destination of the automatic vehicle,
the vehicle interface transmits, to the server device, the destination received by the input, and
the server processor generates the first route information from the plurality of path points based on the destination received from the automatic vehicle.

8. The automatic vehicle dispatching system according to claim 1, further comprising:
a station that performs communication with the server device, and transmits, to the server device, a request for dispatching one of the plurality of automatic vehicles.

9. The automatic vehicle dispatching system according to claim 1, further comprising:
a wireless terminal that performs wireless communication with the server device, and transmits, to the server device, a request for dispatching one of the plurality of automatic vehicles.

10. The automatic vehicle dispatching system according to claim 1, further comprising
a second server device that controls the plurality of automatic vehicles.

11. The automatic vehicle dispatching system according to claim 1,
wherein the additional path points are interposed between the second plurality of path points on the first drive route.

12. The automatic vehicle dispatching system according to claim 1,
wherein the first one of the plurality of automatic vehicles is the second one of the plurality of automatic vehicles,
the additional path points are added to a portion of the first drive route, and
the at least one of the second plurality of path points is in the portion of the first drive route.

13. The automatic vehicle dispatching system according to claim 12, wherein, for a third one of the plurality of automatic vehicles traveling along the first drive route, the additional path points are not added to the portion of the first drive route and the parameters of the driving attributes of the second plurality of path points in the portion of the first drive route are not changed.

\* \* \* \* \*